US012679110B2

(12) United States Patent
Ishihara et al.

(10) Patent No.: US 12,679,110 B2
(45) **Date of Patent: *Jul. 14, 2026**

(54) PRINTING DEVICE INCLUDING LIGHT RADIATION DEVICE WITH INDEPENDENTLY CONTROLLED RADIATION PORTIONS

(71) Applicant: Roland DG Corporation, Hamamatsu (JP)

(72) Inventors: Masanori Ishihara, Hamamatsu (JP); Yuta Fujisawa, Hamamatsu (JP); Takeshi Yagi, Hamamatsu (JP); Yuta Tatebayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 209 days.

This patent is subject to a terminal disclaimer.

(21) Appl. No.: 18/432,223

(22) Filed: Feb. 5, 2024

(65) Prior Publication Data

US 2024/0173999 A1 May 30, 2024

Related U.S. Application Data

(63) Continuation of application No. 17/691,485, filed on Mar. 10, 2022, now Pat. No. 11,926,147, which is a continuation of application No. PCT/JP2019/035726, filed on Sep. 11, 2019.

(51) Int. Cl.
*B41J 11/00* (2006.01)
*B41J 2/21* (2006.01)

(52) U.S. Cl.
CPC ........ *B41J 11/00212* (2021.01); *B41J 2/2114* (2013.01); *B41J 2/2117* (2013.01); *B41J 11/00214* (2021.01); *B41J 11/00218* (2021.01)

(58) Field of Classification Search
CPC ... B41J 11/00212; B41J 2/2114; B41J 2/2117; B41J 11/00214; B41J 11/00218; B41J 2/01
See application file for complete search history.

(56) References Cited

U.S. PATENT DOCUMENTS 11,926,147 B2 * 3/2024 Ishihara ............. B41J 11/00218

OTHER PUBLICATIONS

Ishihara et al., "Printing Device Including Light Radiation Device With Independently Controlled Radiation Portions", U.S. Appl. No. 17/691,485, filed Mar. 10, 2022.

* cited by examiner

*Primary Examiner* — Bradley W Thies
(74) *Attorney, Agent, or Firm* — Keating & Bennett, LLP

(57) ABSTRACT

In a light radiation device including an upstream radiation portion, a middle radiation portion and a downstream radiation portion, the upstream radiation portion overlaps a nozzle array in a transportation direction. A controller includes a path controller to control a path operation of ejecting ink from the nozzle array onto a medium while moving a recording head and the light radiation device in a scanning direction, a transportation controller to control a transportation operation of, after the path operation, transporting the medium downstream in the transportation direction by a distance shorter than a length in the transportation direction of the nozzle array, and a first light radiation controller to control the light radiation device, during the path operation by the path controller, to turn on the upstream radiation portion and the downstream radiation portion and to turn off the middle radiation portion.

19 Claims, 17 Drawing Sheets

PRINTING DEVICE INCLUDING LIGHT RADIATION DEVICE WITH INDEPENDENTLY CONTROLLED RADIATION PORTIONS

CROSS REFERENCE TO RELATED APPLICATIONS

This application claims the benefit of priority to PCT Application No. PCT/JP2019/035726 filed on Sep. 11, 2019. The entire contents of this application are hereby incorporated herein by reference.

BACKGROUND OF THE INVENTION

1. Field of the Invention

The present invention relates to a printing device.

2. Description of the Related Art

An example of known printing device is an inkjet printer. With an inkjet printer disclosed in each of Japanese Patent No. 5041611 and Japanese Laid-Open Patent Publication No. 2015-63057, ultraviolet-curable ink is ejected onto a medium. The ultraviolet-curable ink ejected onto the medium is irradiated with ultraviolet rays, and thus the curing of the ultraviolet-curable ink is promoted.

In order to print a glossy printing image, clear ink is used. For example, clear ink is ejected onto a color image printed with process color ink to form a film of the clear ink. In a process of curing the clear ink, the time period from the ejection of the clear ink until the radiation of the ultraviolet rays toward the clear ink is extended. With such an arrangement, the clear ink is spread while being wet to flatten a surface of the film of the clear ink. As a result, a glossy printing image is printed on the medium. However, with such a manner of printing a glossy printing image on the medium, the process color ink is first ejected and then the clear ink is ejected. This requires extra care. It is desirable that such extra care is not needed.

SUMMARY OF THE INVENTION

Preferred embodiments of the present invention provide printing devices each capable of printing a glossy printing image with the time period requiring extra care being shortened.

A printing device disclosed herein includes a support table, a recording head, a light radiation device, a transportation mechanism, a moving mechanism, and a controller. The support table supports a medium. The recording head includes a nozzle array that includes a plurality of nozzles from which ink is capable of being ejected onto the medium supported by the support table. The nozzles are lined up in a transportation direction. The recording head is provided above the support table. The light radiation device includes a light source and a case with a radiation opening extending therein through which light emitted from the light source passes. The case accommodates the light source. The light radiation device is provided above the support table. The transportation mechanism transports the medium supported by the support table in the transportation direction from an upstream side to a downstream side. The moving mechanism moves the recording head and the light radiation device integrally in a scanning direction crossing the transportation direction as seen in a plan view. Where the light radiation device is divided in the transportation direction into three portions including an upstream radiation portion, a middle radiation portion and a downstream radiation portion from the upstream side to the downstream side, the upstream radiation portion, the middle radiation portion and the downstream radiation portion are capable of being turned on or off independently. The upstream radiation portion overlaps the nozzle array in the transportation direction. A length in the transportation direction of the upstream radiation portion is longer than, or equal to, a distance between the nozzle located at a most upstream position in the transportation direction and the nozzle located at a most downstream position in the transportation direction. The controller is configured or programmed to include a path controller, a transportation controller, and a first light radiation controller. The path controller is configured or programmed to control a path operation of ejecting ink from the nozzle array of the recording head onto the medium supported by the support table while moving the recoding head and the light radiation device in the scanning direction. The transportation controller is configured or programmed to control a transportation operation of, after the path operation, transporting the medium supported by the support table downstream in the transportation direction by a distance shorter than a length in the transportation direction of the nozzle array. The first light radiation controller is configured or programmed to control the light radiation device, during the path operation, to provide an on/off pattern of turning on the upstream radiation portion, turning off the middle radiation portion, and turning on the downstream radiation portion. The middle radiation portion does not overlap the nozzle array in the transportation direction. No light-blocking component is provided at a border between the upstream radiation portion and the middle radiation portion or a border between the middle radiation portion and the downstream radiation portion.

With the above-described printing device, the upstream radiation portion is turned on whereas the middle radiation portion is turned off. Therefore, the light radiation intensity of light from a central portion of the upstream radiation portion is high whereas the light radiation intensity of light from a downstream portion of the upstream radiation portion is relatively low. For this reason, the ink ejected from an upstream portion and a central portion of the nozzle array is irradiated with light having a high radiation intensity from the central portion of the upstream radiation portion, and thus is cured. By contrast, the ink ejected from a downstream portion of the nozzle array is irradiated with light having a low radiation intensity from the downstream portion of the upstream radiation portion, and thus is semi-cured without being cured completely. The semi-cured ink is not cured completely, and thus is spread while being wet and has a surface thereof flattened, until being irradiated with light from the downstream radiation portion. Then, the flattened ink is irradiated with the light from the downstream radiation portion and is cured. Therefore, with the printing device, the time period required for the ink ejected from the nozzle array to be cured may be adjusted step by step, so that a relatively glossy printing image is printed. Therefore, a glossy printing image is printed, with the time period requiring extra care being shortened.

Preferred embodiments of the present invention provide printing devices each capable of printing a glossy printing image with the time period requiring extra care being shortened.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. The preferred embodiments described herein are not intended to specifically limit the present invention.

Figure 1:
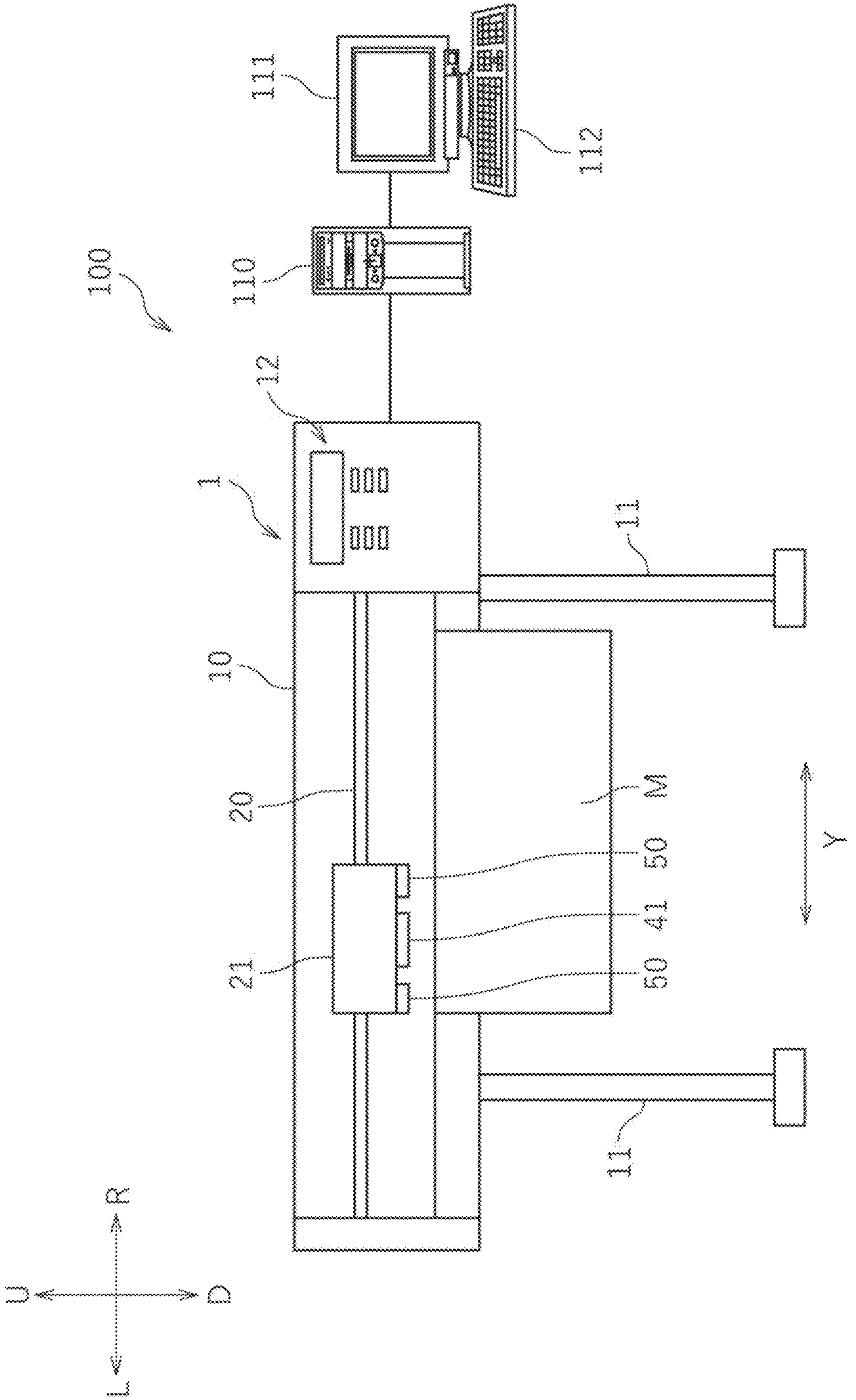
FIG. 1 is a front view of a printing system according to a preferred embodiment of the present invention.
Figure 2:
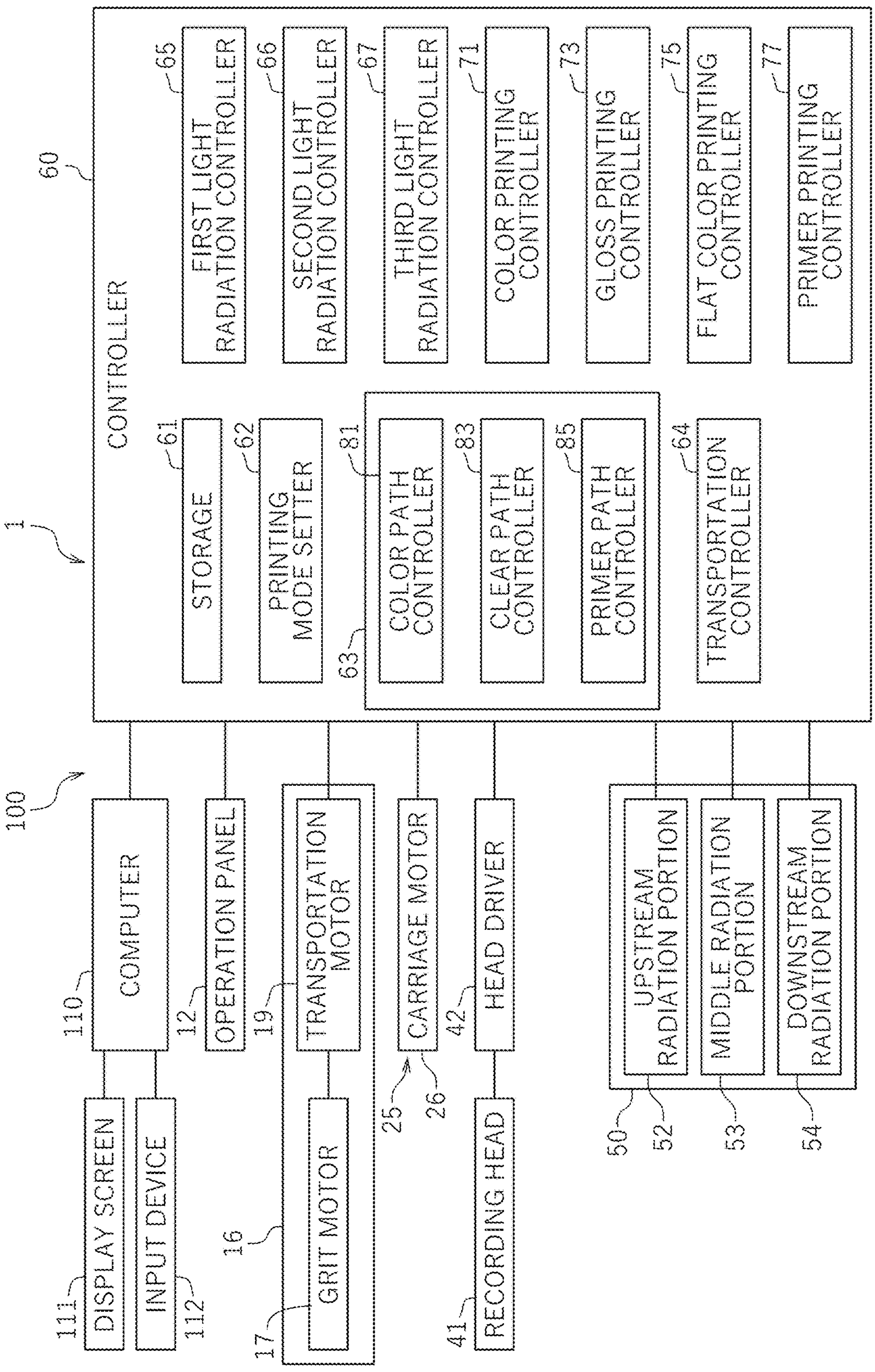
FIG. 2 is a block diagram of the printing system according to a preferred embodiment of the present invention.

FIG. 1 is a front view of a printing system 100 according to this preferred embodiment. FIG. 2 is a block diagram of the printing system 100 according to this preferred embodiment. In the following description, "front", "rear", "left", "right", "up" and "down" are respectively front, rear, left, right, up and down as seen from a position in front of the printing system 100. In this preferred embodiment, letter Y represents a scanning direction, and letter X represents a transportation direction. The scanning direction Y is a direction in which a carriage 21 (see FIG. 1) described below moves, and is a left-right direction in this preferred embodiment. The transportation direction X is a direction in which a medium M (see FIG. 1) moves, and is a front-rear direction in this preferred embodiment. The transportation direction X crosses the scanning direction Y as seen in a plan view. In this preferred embodiment, the transportation direction X and the scanning direction Y are perpendicular to each other as seen in a plan view. In this preferred embodiment, the side from which a medium M is supplied will be referred to as an "upstream side", and the side to which the medium M is discharged after printing will be referred to as a "downstream side". The transportation direction X is a direction from the "upstream side" to the "downstream side" (or from the downstream side to the upstream side). The medium M is transported from the upstream side to the downstream side for printing. These directions are merely defined for the sake of convenience, and do not limit the manner of installation of the printing system 100 in any way.

As shown in FIG. 1, the printing system 100 is a system that ejects ink onto the medium M to perform printing. The medium M is, for example, a recording paper roll. There is no specific limitation on the type of the medium M. The medium M may be, for example, paper such as plain paper, inkjet printing paper or the like; a resin sheet or film of poly (vinylchloride), polyester or the like; a plate; or cloth such as woven cloth, unwoven cloth or the like.

The printing system 100 includes a printing device 1 and a computer 110. It should be noted that in the case where the printing device 1 has a function provided by the computer 110 in the printing system 100, the computer 110 may be omitted and the printing system 100 may include only the printing device 1.

As shown in FIG. 2, the computer 110 is a printing controller that controls the printing device 1. The computer 110 generates an instruction code to control the printing device 1, and transmits the instruction code to the printing device 1. Upon receipt of the instruction code from the computer 110, the printing device 1 performs a control in accordance with the instruction code, and performs printing on the medium M. There is no specific limitation on the type of the computer 110. The computer 110 may be realized by, for example, a general-purpose personal computer. The computer 110 has a printing control program installed thereon. The printing control program is a so-called printer driver. The computer 110 includes a CPU. The CPU executes the printing control program to act as a printing controller that generates an instruction code. In this preferred embodiment, the computer 110 is connected with, for example, a display screen 111, and an input device 112 such as a mouse, a keyboard or the like usable by a user to perform an input operation or the like to the computer 110.

As shown in FIG. 1, the printing device 1 is a device that ejects ink onto the medium M to perform printing. The printing device 1 is, for example, an inkjet printer.

The printing device 1 includes a main body 10 including a casing and also includes legs 11 and an operation panel 12. The legs 11 are provided below the main body 10 and extends downward from the main body 10. The operation panel 12 is usable by the user to perform an operation regarding printing. The operation panel 12 is provided on, for example, a front surface of the main body 10.

Figure 3:
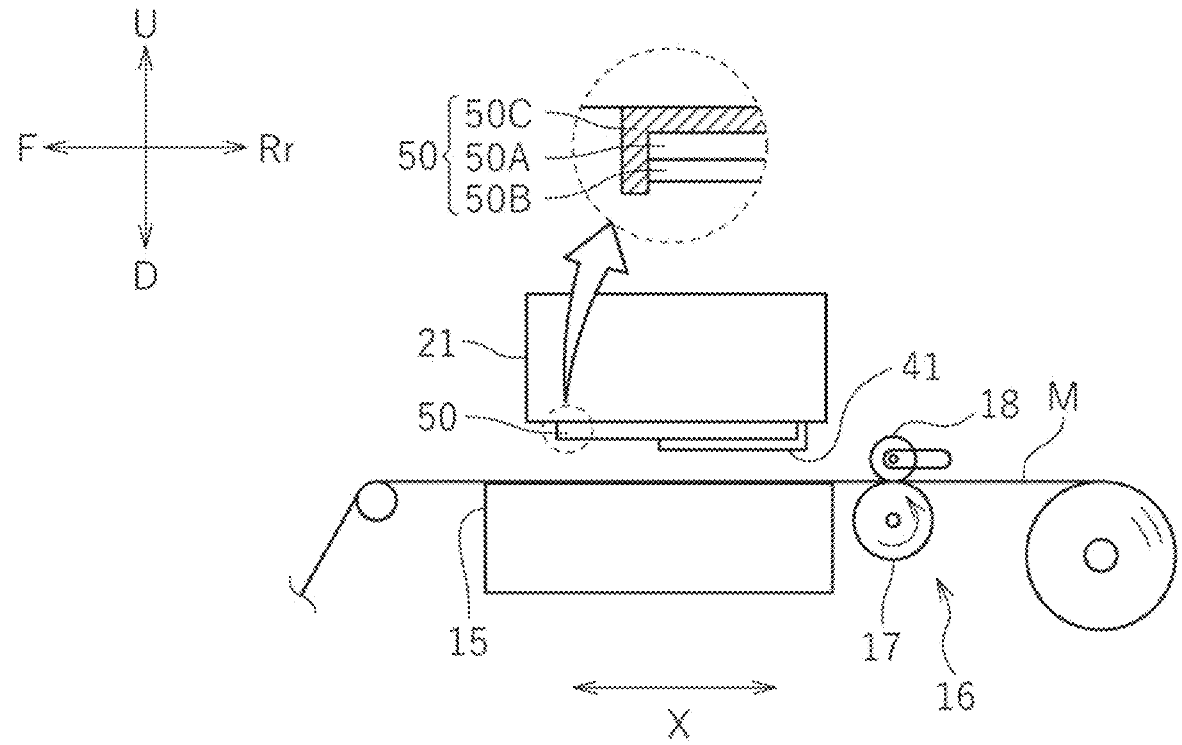
FIG. 3 is a right side view of a printing device, and a schematic view thereof.

FIG. 3 is a right side view of the printing device 1, and is a schematic view thereof. As shown in FIG. 3, the printing device 1 includes a platen 15. The platen 15 is an example of "support table". The platen 15 supports the medium M. Printing onto the medium M is performed on the platen 15. A top surface of the platen 15 is a flat plane expanding in the scanning direction Y and the transportation direction X.

In this preferred embodiment, the printing device 1 includes a transportation mechanism 16. The transportation mechanism 16 is a mechanism that transports the medium M supported by the platen 15 from the upstream side to the downstream side (in this preferred embodiment, from the rear to the front) of the transportation direction X. There is no specific limitation on the configuration of the transportation mechanism 16. The transportation mechanism 16 includes, for example, a grit roller 17, a pinch roller 18, and a transportation motor 19 (see FIG. 2). In FIG. 3, the grit roller 17 is located to the rear of the platen 15. Alternatively, the grit roller 17 may be embedded in the platen 15 such that a top portion thereof is exposed. The pinch roller 18 holds the medium M together with the grit roller 17. The pinch roller 18 is located just above the grit roller 17. The transportation motor 19 is connected with the grit roller 17.

In this preferred embodiment, the transportation motor 19 is driven to rotate the grit roller 17. When the grit roller 17 is rotated, the medium M held by the grit roller 17 and the pinch roller 18 is transported in the transportation direction X (in this preferred embodiment, downstream). There is no specific limitation on the number of the grit rollers 17 or the number of the pinch rollers 18. A plurality of grit rollers 17 and a plurality of pinch rollers 18 may be provided. In the case where, for example, the plurality of grit rollers 17 are provided, the plurality of grit rollers 17 are lined up in the scanning direction Y.

As shown in FIG. 1, the printing device 1 includes a guide rail 20 and the carriage 21. The guide rail 20 extends in the scanning direction Y above the platen 15 (see FIG. 3). The guide rail 20 is secured to the main body 10. The carriage 21 is slidably engaged with the guide rail 20. In FIG. 3, the guide rail 20 is omitted. As shown in FIG. 3, the carriage 21 is located above the platen 15. The carriage 21 is movable in the scanning direction Y along the guide rail 20.

In this preferred embodiment, as shown in FIG. 2, the printing device 1 includes a moving mechanism 25. The moving mechanism 25 is a mechanism that moves the carriage 21 in the scanning direction Y. There is no specific limitation on the configuration of the moving mechanism 25. In this preferred embodiment, the moving mechanism 25 includes left and right pulleys (not shown), a belt (not shown), and a carriage motor 26. Although not shown in detail, the left pulley is located at a left end of the guide rail 20, and the right pulley is located at a right end of the guide rail 20. The belt is, for example, an endless belt and are wound along the left and right pulleys. The carriage 21 is secured to the belt. The carriage motor 26 is connected with, for example, the right pulley, and is connected with the carriage 21 via the pulley and the belt. In this preferred embodiment, when the carriage motor 26 is driven, the right pulley is rotated to run the belt between the pair of pulleys. As a result, the carriage 21 is moved in the scanning direction Y.

As shown in FIG. 1, the printing device 1 includes a recording head 41 and light radiation devices 50. As shown in FIG. 3, the recording head 41 is located above the platen 15. In this preferred embodiment, the recording head 41 is mounted on the carriage 21, and is movable in the scanning direction Y together with the carriage 21.

Figure 4:
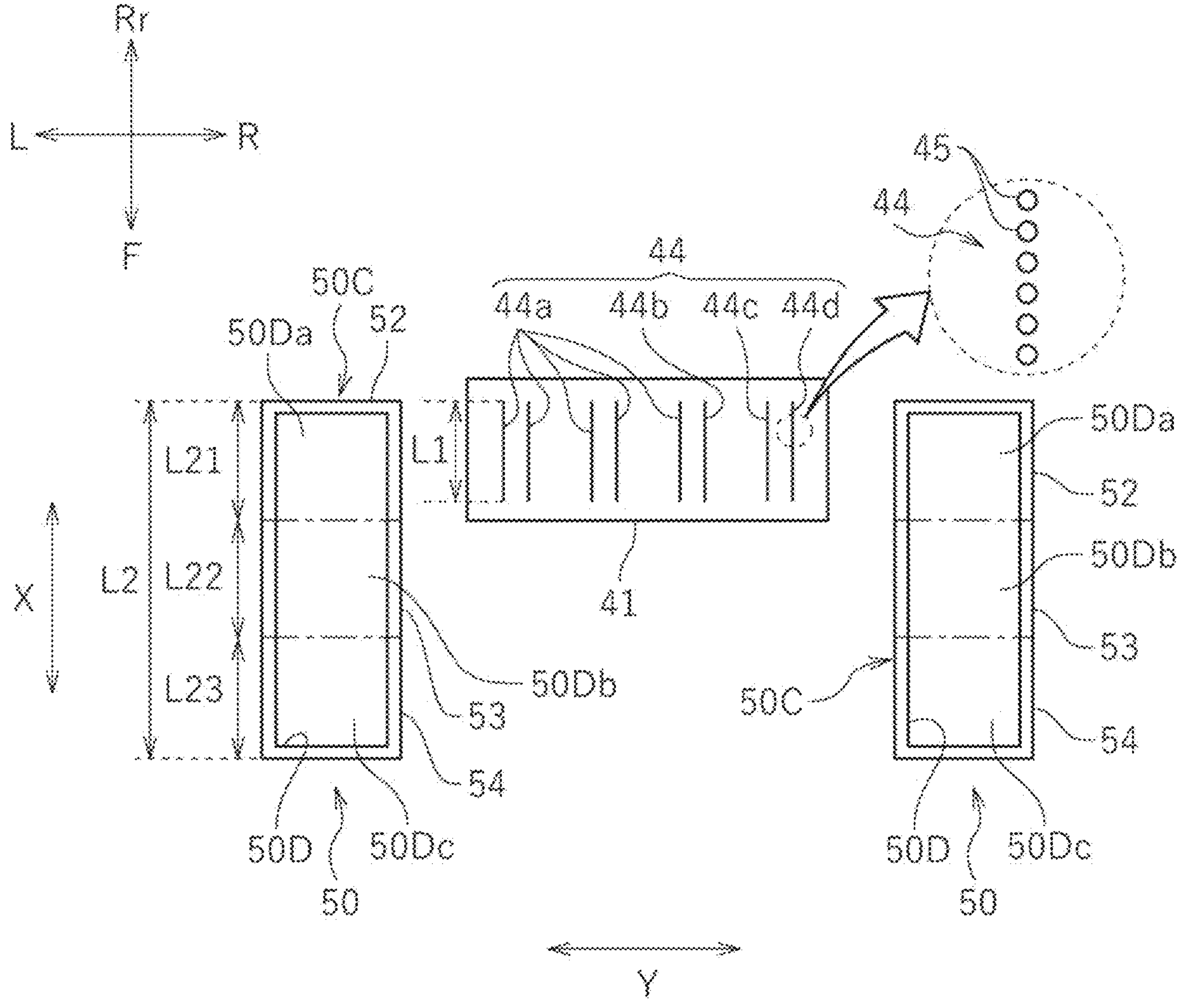
FIG. 4 is a bottom view showing the positional relationship between nozzle arrays of a recording head and light radiation devices.

The recording head 41 ejects ink onto the medium M supported by the platen 15. FIG. 4 is a bottom view of the printing device 1 showing the positional relationship between nozzle arrays 44 of the recording head 41 and the light radiation devices 50. In this preferred embodiment, the recording head 41 includes a plurality of nozzles 45 (see an enlarged view of the area enclosed by the dotted line in FIG. 4) from which the ink is ejected. The plurality of 45 partially nozzles are lined up in the transportation direction X. In this preferred embodiment, an array of the plurality of nozzles 45 lined up in the transportation direction X will be referred to as the "nozzle array 44". A plurality of the nozzle arrays 44 are provided in a bottom surface of the recording head 41. The plurality of nozzle arrays 44 are lined up in the scanning direction Y. Upstream ends of the plurality of nozzle arrays 44 are aligned with each other. Downstream ends of the plurality of nozzle arrays 44 are aligned with each other. The plurality of nozzle arrays 44 have the same lengths, length L1, in the transportation direction X.

In this preferred embodiment, as shown in FIG. 2, the recording head 41 is connected with a head driver 42. The head driver 42 is a driver that causes ink drops to be ejected or not to be ejected from the plurality of nozzles 45 included in each nozzle array 44. There is no specific limitation on the type of the head driver 42. In the case where, for example, the recording head 41 is of a piezo system, the head driver 42 is a driver that drives a piezo element.

In this preferred embodiment, there is no specific limitation on the color of the ink ejected from each of the plurality of nozzle arrays 44. In this preferred embodiment, the nozzle arrays 44 include a color nozzle array 44*a*, a white nozzle array 44*b*, a clear nozzle array 44*c*, and a primer nozzle array 44*d*. The color nozzle array 44*a* is a nozzle array provided to print a color image. From the color nozzle array 44*a*, process color ink (hereinafter, referred to also as "color ink") is ejected. Examples of the color ink include colored ink such as, for example, cyan ink, magenta ink, yellow ink, black ink and the like. Examples of the color ink may further include light cyan ink, light magenta ink, light yellow ink, and the like.

The white nozzle array 44*b* is a nozzle array from which white ink is ejected. The white ink is used to represent a white portion of the printing image. The clear nozzle array 44*c* is a nozzle array from which clear ink is ejected. The clear ink may be transparent or translucent. The clear ink is used to, for example, coat a color image printed with color ink or the like. The clear ink is used to, for example, make a surface of the color image glossy.

The primer nozzle array **44*d*** is a nozzle array from which primer ink is ejected. The primer ink is called, for example, underlying ink, and is directly ejected onto the medium M. The primer ink is located, for example, between the medium M and the color ink used to form a color image. The primer ink increases the adhesiveness of the color ink to the medium M.

In this preferred embodiment, the white ink, the clear ink and the primer ink will collectively be referred to as "special ink". Examples of the special ink also include, for example, silver ink. The nozzle arrays may include a nozzle array from which special ink other than the white ink, clear ink and the primer ink is ejected.

In this preferred embodiment, the ink to be ejected from the nozzles 45 included in the nozzle arrays 44 of the recording head 41 is photocurable ink. The curing of the photocurable ink is promoted when the photocurable ink is irradiated with light. In this preferred embodiment, the photocurable ink is ultraviolet-curable ink (e.g., UV ink). Alternatively, the photocurable ink may be ink cured when being irradiated with light of another wavelength. The photocurable ink has a property of being fluidic before being irradiated with light but of being cured when being irradiated with a predetermined amount of light.

In the following description, a state of the ink before the ink is completely cured (e.g., a state where the ink is uncured inside but is cured at a surface thereof) may be referred to as "semi-cured" or "semi-cured state". In the following description, photocurable ink may be referred to "ink" when appropriate. In the following description, one drop of ink that has landed on the medium M will be referred to as an "ink dot" or simply a "dot".

Now, the light radiation devices 50 will be described. The light radiation devices 50 radiate light toward the ink that has landed on the medium M supported by the platen 15. In this preferred embodiment, the light radiation devices 50 radiate ultraviolet rays. As shown in FIG. 3, the light radiation devices 50 are located above the platen 15. In this preferred embodiment, the light radiation devices 50 are mounted on the carriage 21. The light radiation devices 50 are movable in the scanning direction Y together with the carriage 21 and the recording head 41.

There is no specific limitation on the number of the light radiation devices 50. As shown in FIG. 1, two light radiation devices 50 are provided in this preferred embodiment. The left light radiation device 50 is provided on a left portion of the carriage 21, and is located to the left of the recording head 41. The right light radiation device 50 is provided on a right portion of the carriage 21, and is located to the right of the recording head 41. The recording head 41 is located as being sandwiched between the two light radiation devices 50. Either the left light radiation device 50 or the right light radiation device 50 may be omitted. In this preferred embodiment, while the carriage 21 is moved from the right to the left of the scanning direction Y, at least the right light radiation device 50 radiates light. While the carriage 21 is moved from the left to the right of the scanning direction Y, at least the left light radiation device 50 radiates light.

As shown in FIG. 4, the light radiation devices 50 are configured to radiate light toward a region longer in the transportation direction X than the nozzle arrays 44. There is no specific limitation on the configuration of the light radiation devices 50. In this preferred embodiment, as shown in FIG. 3, the light radiation devices 50 each include a light source 50A, a lens 50B, and a case 50C. The light source 50A emits light, for example, ultraviolet rays. There is no specific limitation on the type of the light source 50A. In this preferred embodiment, the light source 50A is an LED (Light Emitting Diode) array. The LED array includes a plurality of LEDs lined up in the transportation direction X.

The lens 50B extends in the transportation direction X. The lens 50B may include a plurality of lenses lined up in the transportation direction X, or may include one lens extending in the transportation direction X. The lens 50B is located just below the light source 50A. Light radiating from the light source 50A irradiates the medium M via the lens 50B.

The case 50C accommodates the light source 50A and the lens 50B. As shown in FIG. 4, a bottom surface of the case 50C has one radiation opening 50D formed therein, and the radiation opening 50D extends in the transportation direction X. Light radiating from the light source 50A passes the radiation opening 50D and irradiates the medium M supported by the platen 15. In this preferred embodiment, the case 50C suppresses or prevents light from leaking to the outside of a predetermined region (e.g., a region of the medium M that faces each light radiation device 50).

In this preferred embodiment, each light radiation device 50 has length L2 in the transportation direction X. In a state where the medium M supported by the platen 15 is irradiated with the light from the light radiation device 50, length L2 of the light radiation device 50 is a length in the transportation direction X of an irradiation region of the medium M irradiated with the light. In the case where the length in the transportation direction X of the irradiation region and the length in the transportation direction X of the radiation opening 50D are equal to each other, length L2 of the light radiation device 50 is the length in the transportation direction X of the radiation opening 50D.

In this preferred embodiment, length L2 of the light radiation device 50 is at least three times length L1, which is the length of the nozzle arrays 44, and shorter than five times length L1. The light radiation device 50 is located such that a portion thereof on the upstream side is aligned with the nozzle arrays 44 in the scanning direction Y. The light radiation device 50 is located such that a portion thereof on the downstream side protrudes downstream in the transportation direction X from a downstream end of the nozzle arrays 44.

In this preferred embodiment, the light radiation devices 50 each include an upstream radiation portion 52, a middle radiation portion 53, and a downstream radiation portion 54. The light radiation device 50 includes a radiation portion that is divided into three portions, namely, the upstream radiation portion 52, the middle radiation portion 53 and the downstream radiation portion 54. The upstream radiation portion 52, the middle radiation portion 53 and the downstream radiation portion 54 cannot be physically separated from each other, but are conceptually separated from each other when being controlled to be turned on or off. In this preferred embodiment, in a state where the light radiation device 50 is divided into three in the transportation direction X, the three portions are the upstream radiation portion 52, the middle radiation portion 53, and the downstream radiation portion 54 from the upstream side. The expression that "the light radiation device 50 is divided into three" indicates, for example, that the light radiation device 50 is equally divided into three. In this preferred embodiment, the irradiation region of the medium M irradiated with the light from the light radiation device 50 is divided into three regions in the transportation direction X. A portion of the light radiation device 50 that radiates light toward a most upstream region of the medium M among the three regions is the upstream radiation portion 52. A portion of the light radiation device 50 that radiates light toward a middle region of the medium M among the three regions is the middle radiation portion 53. A portion of the light radiation device 50 that radiates light toward a most downstream region of the medium M among the three regions is the downstream radiation portion 54.

In the state where the light radiation device 50 is divided into three in the transportation direction X, the upstream radiation portion 52 is the portion of the light radiation device 50 that is located at the most upstream position. The upstream radiation portion 52 is aligned with the nozzle arrays 44 in the scanning direction Y. The upstream radiation portion 52 overlaps the nozzle arrays 44 in the transportation direction X. The position in the transportation direction X of the upstream radiation portion 52 overlaps the position in the transportation direction X of the nozzle arrays 44. Therefore, the upstream radiation portion 52 is allowed to radiate light toward dots of the ink that have just landed on the medium M after being ejected from the nozzles 45 of the nozzle array 44. In other words, immediately after the ink lands on a printing region, the upstream radiation portion 52 is allowed to radiate light toward the printing region, on which the ink ejected from the nozzle array 44 lands.

In the state where the light radiation device 50 is divided into three in the transportation direction X, the middle portion 53 is the portion of the light radiation device 50 that is located at the middle position. The middle radiation portion 53 is adjacent to, and downstream with respect to, the upstream radiation portion 52 in the transportation direction X. Since the middle radiation portion 53 is adjacent to the upstream radiation portion 52, there is no component or portion between the upstream radiation portion 52 and the middle radiation portion 53. The position of the middle radiation portion 53 in the transportation direction X does not overlap the position in the transportation direction X of the nozzle arrays 44. In other words, the middle radiation portion 53 does not overlap the nozzle arrays 44 in the transportation direction X. The middle radiation portion 53 is located downstream with respect to the upstream radiation portion 52 and the nozzle arrays 44.

In the state where the light radiation device 50 is divided into three in the transportation direction X, the downstream radiation portion 54 is the portion of the light radiation device 50 that is located at the most downstream position. The downstream radiation portion 54 is adjacent to, and downstream with respect to, the middle radiation portion 53 in the transportation direction X. Since the downstream radiation portion 54 is adjacent to the middle radiation portion 53, there is no component or portion between the downstream radiation portion 54 and the middle radiation portion 53. The position of the downstream radiation portion 54 in the transportation direction X does not overlap the position in the transportation direction X of the nozzle arrays 44. In other words, the downstream radiation portion 54 does not overlap the nozzle arrays 44 in the transportation direction X. The downstream radiation portion 54 is located downstream with respect to the middle radiation portion 53 and the nozzle arrays 44.

In this preferred embodiment, the upstream radiation portion 52, the middle radiation portion 53 and the downstream radiation portion 54 respective have lengths L21, L22 and L23 in the transportation direction X. Lengths L21, L22 and L23 are equal to each other. The expression "equal length" refers to a case where the lengths are exactly equal to each other, and may also refer to a case where the lengths may be slightly different from each other. In this preferred embodiment, length L21 of the upstream radiation portion 52 is slightly longer than length L1 of the nozzle arrays 44. In other words, L21>L1. Similarly, L22>L1 and L23>L1.

In this preferred embodiment, one radiation opening 50D is formed in each light radiation device 50 so as to extend through the upstream radiation portion 52, the middle radiation portion 53 and the downstream radiation portion 54. In this preferred embodiment, a region 50Da, of the radiation opening 50D, that is in the upstream radiation portion 52 and a region 50Db, of the radiation opening 50D, that is in the middle radiation portion 53 are continuous to each other. No component is located between the region 50Da and the region 50Db. Similarly, the region 50Db, of the radiation opening 50D, that is in the middle radiation portion 53, and a region 50Dc, of the radiation opening 50D, that is in the downstream radiation portion 54 are continuous to each other. No component is located between the region 50Db and the region 50Dc.

In this preferred embodiment, the upstream radiation portion 52, the middle radiation portion 53 and the downstream radiation portion 54 are configured to be turned on or off independently. The expression that the upstream radiation portion 52 is turned on or off refers to that the light source 50A, which radiates light toward the most upstream region among the three divided regions of the irradiation region and is included in the upstream radiation portion 52, is turned or off. The expression that the middle radiation portion 53 is turned on or off refers to that the light source 50A, which radiates light toward the middle region among the three divided regions of the irradiation region and is included in the middle radiation portion 53, is turned on or off. Similarly, the expression that the downstream radiation portion 54 is turned on or off refers to that the light source 50A, which radiates light toward the most downstream region among the three divided regions of the irradiation region and is included in the downstream radiation portion 54, is turned on or off.

As shown in FIG. 2, the printing device 1 includes a controller 60. The controller 60 is configured or programmed to control the printing device 1. There is no specific limitation on the configuration of the controller 60. For example, the controller 60 includes an interface (I/F) receiving, for example, an instruction code, which is coded printing data, from the computer 110 or the like as an external device, the central processing unit (CPU) executing a command of a control program, a ROM (read only memory) storing the program to be executed by the CPU, a RAM (random access memory) usable as a working area where the program is developed, and a storage device such as a memory or the like that stores the above-described program, various data and the like.

The controller 60 is connected with the operation panel 12, the transportation motor 19 of the transportation mechanism 16, the carriage motor 26 of the moving mechanism 25 and the head driver 42 connected with the recording head 41. The controller 60 controls the transportation motor 19, the carriage motor 26 and the head driver 42 based on an instruction code from the computer 110. The controller 60 is connected with the light radiation devices 50 (in more detail, with the upstream radiation portions 52, the middle radiation portions 53 and the downstream radiation portions 54), and is capable of controlling the light sources 50A of each light radiation device 50 to be turned on or off. In this preferred embodiment, the controller 60 is configured or programmed to control the upstream radiation portion 52, the middle radiation portion 53 and the downstream radiation portion 54 of the light radiation device 50 to be turned on or off independently.

In this preferred embodiment, the controller 60 includes a storage 61, a printing mode setter 62, a path controller 63, a transportation controller 64, a first light radiation controller 65, a second light radiation controller 66, and a third light radiation controller 67. The controller 60 further includes a color printing controller 71, a gloss printing controller 73, a flat color printing controller 75, and a primer printing controller 77. The path controller 63 of the controller 60 is configured or programmed to include a color path controller 81, a clear path controller 83, and a primer path controller 85. Each of the above-listed components of the controller 60 may be realized by software or hardware. For example, each of the above-listed components may have a function thereof executed by a processor or may be incorporated into a circuit.

Each of the components of the controller 60 will be described below in detail. For example, the first through third light radiation controllers 65 through 67 control the upstream radiation portion 52, the middle radiation portion 53 and the downstream radiation portion 54 to be turned on or off in accordance with the printing mode. The first light radiation controller 65 executes a control of, in a flat color printing mode or in a primer printing mode described below, turning on the upstream radiation portion 52, turning off the middle radiation portion 53 and turning on the downstream radiation portion 54 (see FIG. 10A and FIG. 13A). The second light radiation controller 66 executes a control of, in a color printing mode, turning on the upstream radiation portion 52, the middle radiation portion 53 and the downstream radiation portion 54 (see FIG. 8A). The third light radiation controller 67 executes a control of, in a gloss printing mode, turning off the upstream radiation portion 52 and the middle radiation portion 53 and turning on the downstream radiation portion 54 (see FIG. 9A).

In this preferred embodiment, a path operation and a transportation operation are repeated alternately to perform printing on the medium M. The "path operation" refers to an operation of ejecting ink onto the medium M supported by the platen 15 from the nozzle array 44 of the recording head 41 while moving the recording head 41 and the light radiation devices 50 integrally in the scanning direction Y. In the case of bidirectional printing (by which printing is performed each time when the recording head 41 is moved in the scanning direction Y, namely, each time when the recording head 41 is moved from the right to the left and each time when the recording head 41 is moved from the left to the right), one path operation is an operation performed while the recording head 41 and the light radiation devices 50 are moved in the scanning direction Y from the right to the left once or from the left to the right once. In the case of monodirectional printing (by which printing is performed only when the recording head 41 is moved forward in the scanning direction Y or only when the recording head 41 is moved backward in the scanning direction Y), one path operation is an operation performed while the recording head 41 and the light radiation devices 50 are moved back and forth once. One path operation is referred to also as "one path".

In this preferred embodiment, the path operation is performed under the control of the path controller 63. The path controller 63 is programmed to control the path operation such that ink is ejected onto the medium M supported by the platen 15 from the nozzle array 44 of the recording head 41 while the recording head 41 and the light radiation devices 50 are moved by the moving mechanism 25 in the scanning direction Y. In this preferred embodiment, the path controller 63 controls the driving of the carriage motor 26 of the moving mechanism 25. The carriage motor 26 is driven to move the carriage 21 in the scanning direction Y. The carriage 21 is moved to integrally move the recording head 41 and the light radiation devices 50 in the scanning direction Y.

In this preferred embodiment, different controllers included in the path controller 63 perform the control in accordance with the type of ink to be ejected from the nozzle array 44. In this preferred embodiment, the color path controller 81 of the path controller 63 controls the head driver 42 to eject the process color ink and the white ink during the path operation. In more detail, the color path controller 81 controls the path operation such that the process color ink is ejected from the color nozzle array 44*a* among the nozzle arrays 44 and the white ink is ejected from the white nozzle array 44*b*.

The clear path controller 83 of the path controller 63 controls the head driver 42 to eject the clear ink during the path operation. In more detail, the clear path controller 83 controls the path operation such that the clear ink is ejected from the clear nozzle array 44*c* among the nozzle arrays 44. The primer path controller 85 of the path controller 63 controls the head driver 42 to eject the primer ink during the path operation. In more detail, the primer path controller 85 controls the path operation such that the primer ink is ejected from the primer nozzle array 44*d* among the nozzle arrays 44.

The transportation operation refers to an operation of transporting the medium M supported by the platen 15 downstream in the transportation direction X after the path operation performed under the control of the path controller 63. In this preferred embodiment, the transportation operation is performed under the control of the transportation controller 64. The transportation controller 64 is programmed to, after the path operation, control the transportation operation of transporting the medium M supported by the platen 15 downstream in the transportation direction X by a predetermined distance.

The predetermined distance is, in other words, a transportation amount of the medium M. The predetermined distance is shorter than, or equal to, length L1 (see FIG. 4) in the transportation direction X of the nozzle arrays 44. The predetermined distance is, for example, ¼ of length L1 of the nozzle arrays 44. The predetermined distance is set in advance, and is stored on the storage 61. After the transportation operation, the path operation is controlled again.

As described above, the path operation and the transportation operation are repeated alternately to perform printing onto the medium M. In this preferred embodiment, the printing is performed with, specifically, multi-path printing. With the multi-path printing, ink is ejected onto an arbitrary region of the entire printing region of the medium M in each path operation among a plurality of path operations, and thus the printing in the arbitrary region is completed. In other words, with the multi-path printing, the recording head 41 passes above the same region of the entire printing region a plurality of times to perform printing.

Now, the multi-path printing will be described briefly. FIGS. 5A through 5F illustrate formation of dots in the multi-path printing, and are each a plan view showing the positional relationship between the nozzle array 44 and the medium M. The nozzle array 44 is shown conceptually as, for example, being rectangular. FIGS. 5A through 5F show the multi-path printing with one nozzle array 44 for the sake of simplicity. The nozzle array 44 in FIGS. 5A through 5F may be the color nozzle array 44*a*, the white nozzle array 44*b*, the clear nozzle array 44*c* or the primer nozzle array 44*d*.

Figure 5A:
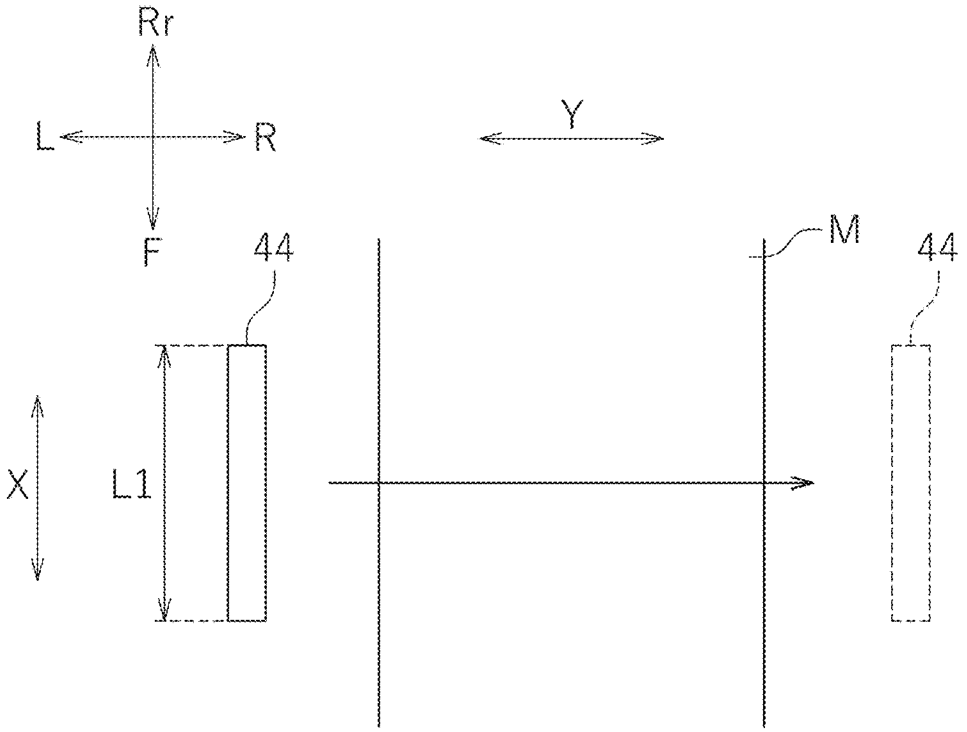
FIG. 5A illustrates formation of dots in multi-path printing, and is a plan view showing the positional relationship between the nozzle array and a medium.
Figure 5B:
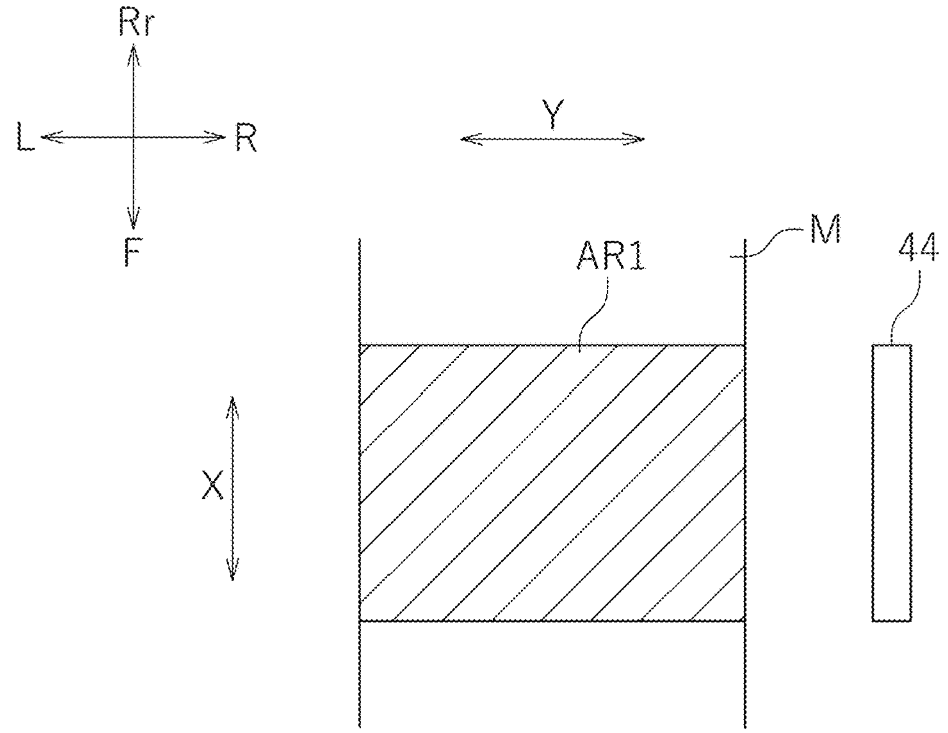
FIG. 5B illustrates the formation of the dots in the multi-path printing, and is a plan view showing the positional relationship between the nozzle array and the medium.

As shown in FIGS. 5A and 5B, one path operation is performed under the control of the path controller 63 (in this example, the path operation is performed while the recording head 41 is moved from the left to the right (see the arrow in FIG. 5A)) to form dots of ink on the medium M. In FIG. 5B, a path printing region AR1, where the ink dots are formed by a first path operation, is hatched. The path printing region AR1 is a region, of the medium M, that faces the nozzle array 44 while the carriage 21 passes just above the medium M (in other words, a region, of the medium M, that passes just below the nozzle array 44).

Figure 5C:
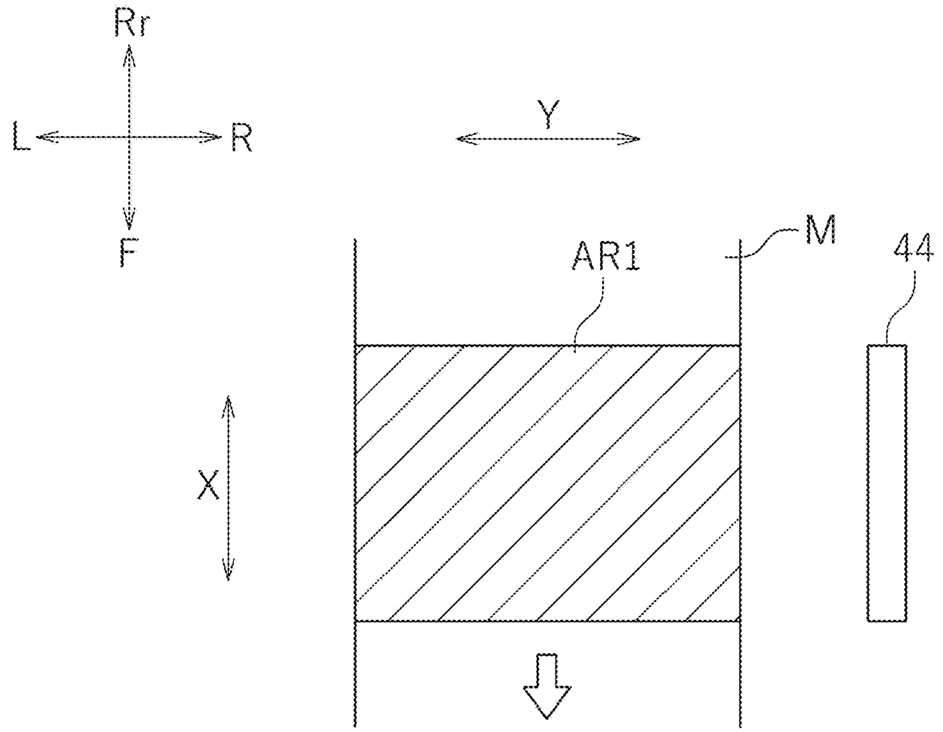
FIG. 5C illustrates the formation of the dots in the multi-path printing, and is a plan view showing the positional relationship between the nozzle array and the medium.
Figure 5D:
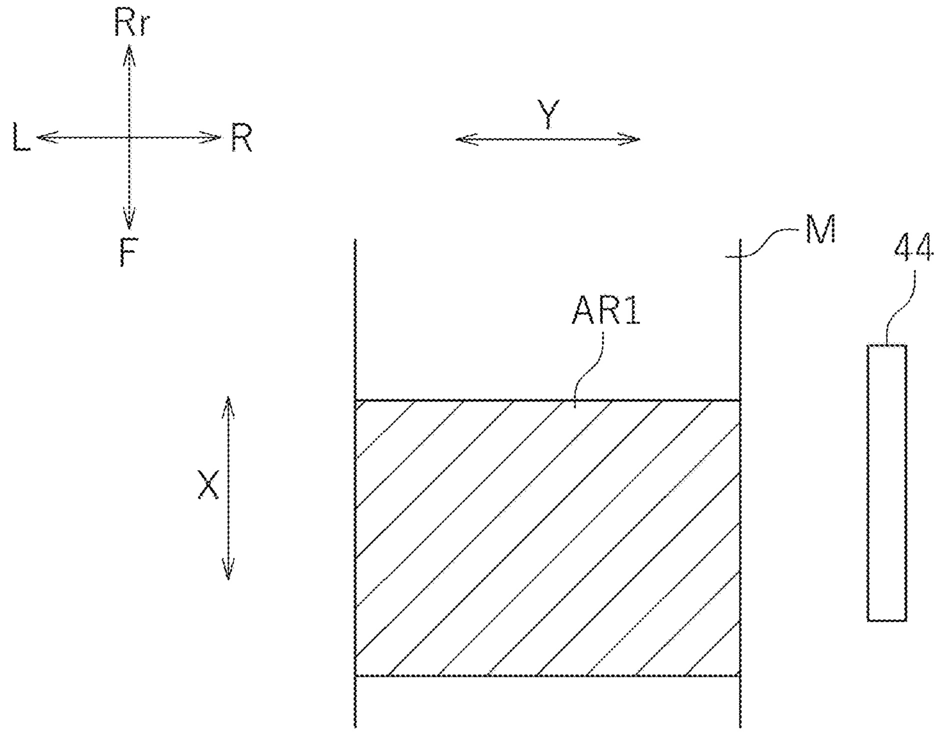
FIG. 5D illustrates the formation of the dots in the multi-path printing, and is a plan view showing the positional relationship between the nozzle array and the medium.

After the first path operation is performed under the control of the path controller 63 as described above, the transportation operation of transporting the medium M downstream in the transportation direction X is performed under the control of the transportation controller 64 (see the arrow in FIG. 5C). As a result of the transportation operation, a downstream portion of the path printing region AR1, on which the printing is performed by the immediately previous path operation (in this example, the first path operation), is moved to a position downstream with respect to the nozzle array 44 (see FIG. 5D).

Figure 5E:
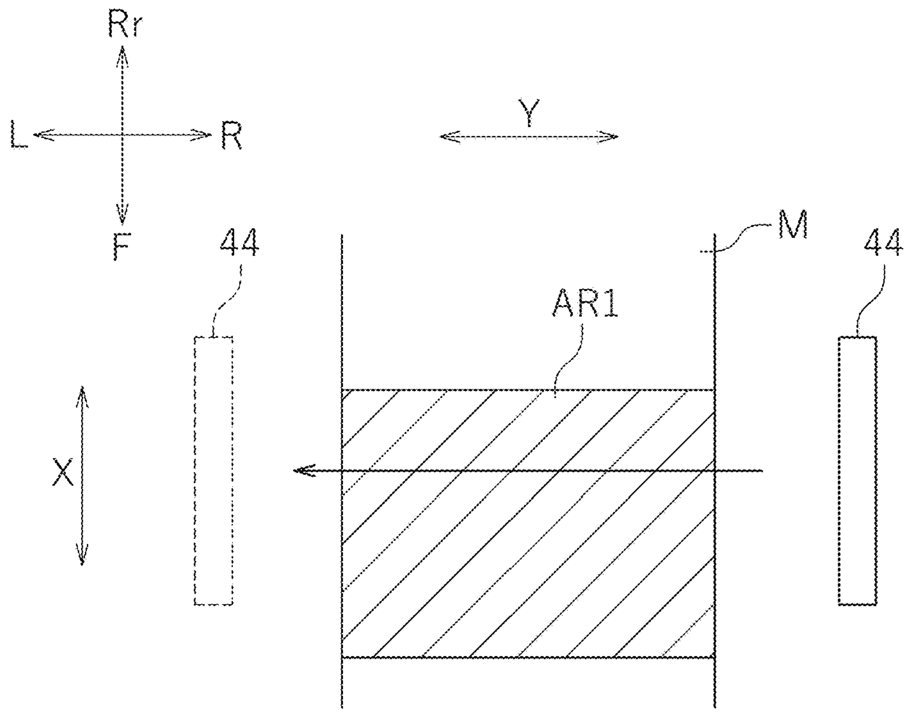
FIG. 5E illustrates the formation of the dots in the multi-path printing, and is a plan view showing the positional relationship between the nozzle array and the medium.
Figure 5F:
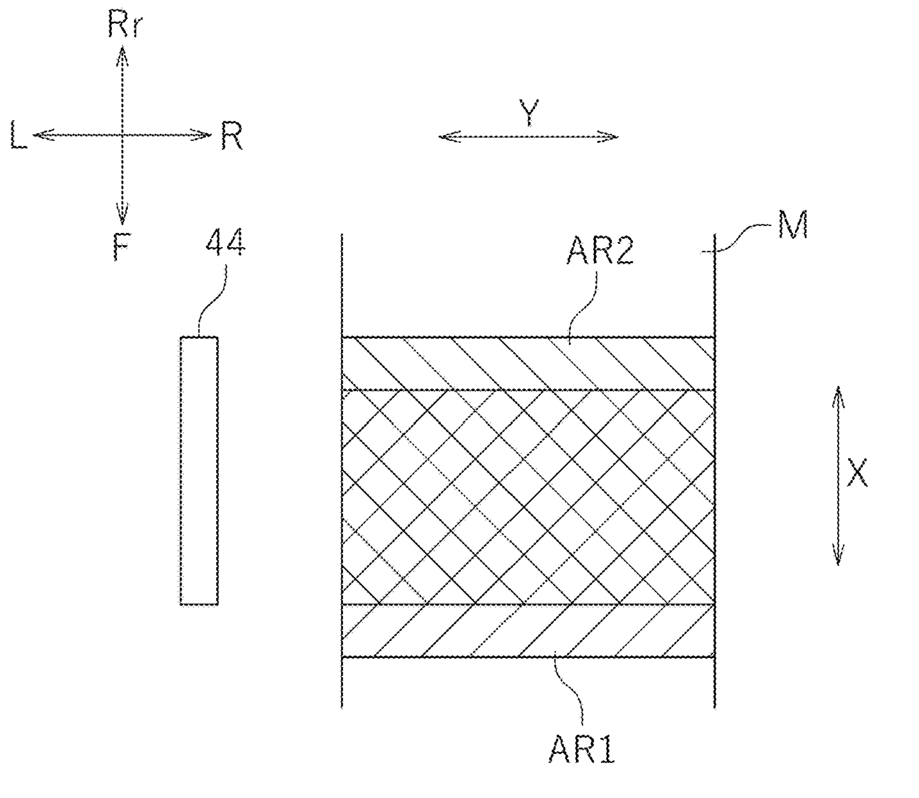
FIG. 5F illustrates the formation of the dots in the multi-path printing, and is a plan view showing the positional relationship between the nozzle array and the medium.

After the first transportation operation, as represented by the arrow in FIG. 5E, a second path operation (in this example, the path operation is performed while the recording head 41 is moved from the right to the left) is performed under the control of the path controller 63. As a result, as shown in FIG. 5F, ink dots are formed on a path printing region AR2. After this, the path operation and the transportation operation are repeated alternately to form ink dots on the medium M sequentially. In the case where, as shown in FIG. 5F, the distance by which the medium M is transported during the transportation operation (transportation amount) is shorter than the length in the transportation direction X of the path printing region AR1, namely, length L1 in the transportation direction X of the nozzle array 44, the path printing region AR2 partially overlaps the path printing region AR1 formed by the immediately previous path operation. In FIG. 5F, the overlapping region is cross-hatched. Such a type of printing by which a part of the path printing region AR1 and a part of the path printing region AR2 overlap each other is the multi-path printing.

Figure 6:
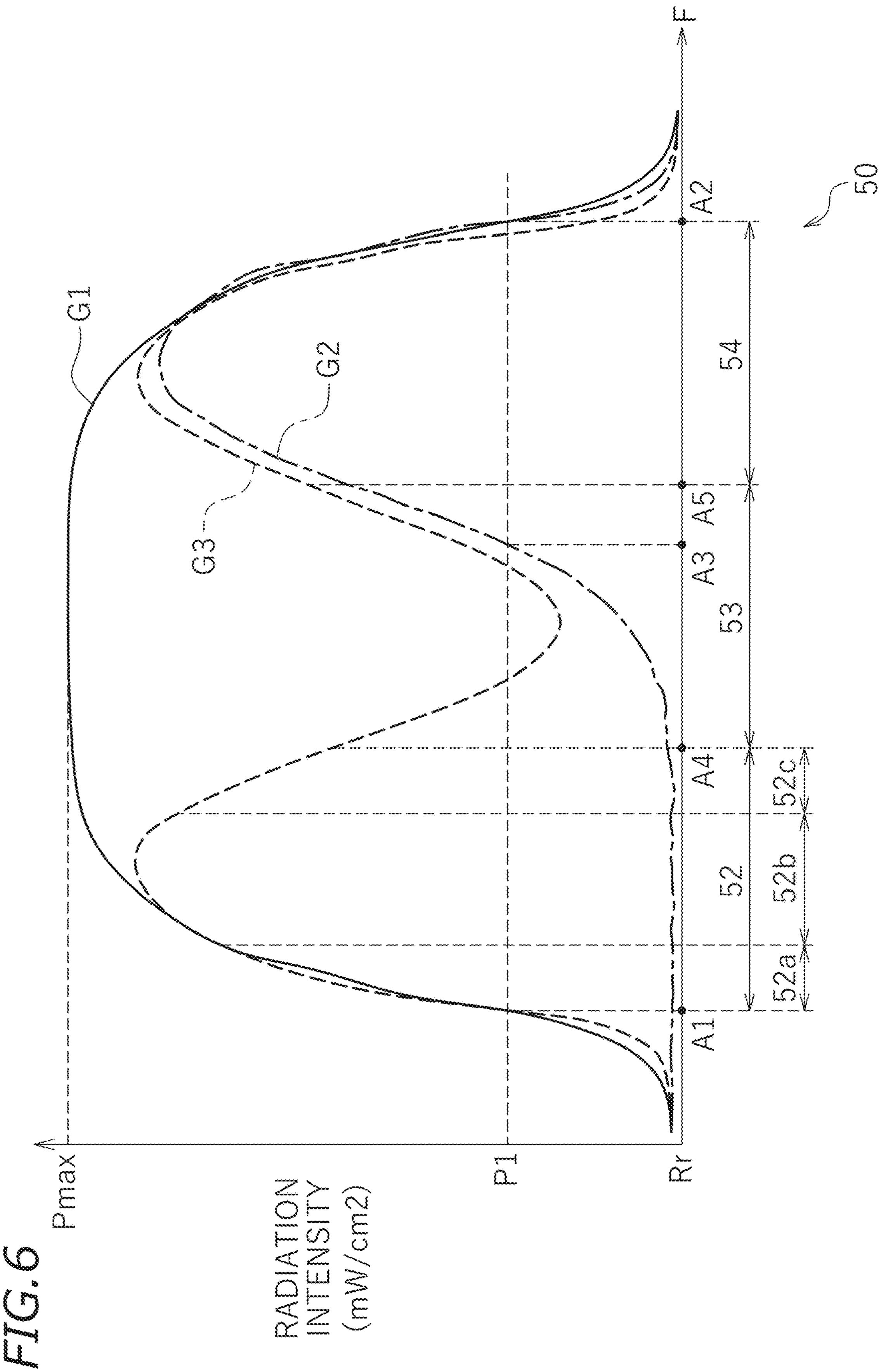
FIG. 6 is a graph showing the light radiation intensity with respect to various portions in a transportation direction of the light radiation device.

FIG. 6 is a graph showing the light radiation intensity with respect to various portions in the transportation direction X of the light radiation device 50. In FIG. 6, the horizontal axis represents the positions of various portions in the transportation direction X of the light radiation device 50. The left side of FIG. 6 corresponds to the upstream side, and the right side of FIG. 6 corresponds to the downstream side. The vertical axis represents the light radiation intensity per a unit area (unit: $mW/cm^2$).

In FIG. 6, curve G1 represents the light radiation intensity in the case where the upstream radiation portions 52, the middle radiation portion 53 and the downstream radiation portion 54 are all turned on. As represented by curve G1, in the case where the radiation portions 52, 53 and 54 are all turned on, the radiation intensity exhibits a maximum value Pmax in a central portion of the light radiation device 50. In FIG. 6, value P1 is the minimum radiation intensity required to cure or semi-cure the photocurable ink. In this preferred embodiment, in the case of curve G1, the length in the transportation direction X of a region having a light radiation intensity of value P1 or higher is set to correspond to length L2 in the transportation direction X of the light radiation device 50 (see FIG. 4). Position A1, on the upstream side of the light radiation device 50, at which the radiation intensity has value P1 corresponds to an upstream end of the upstream radiation portion 52. Position A2, on the downstream side of the light radiation device 50, at which the radiation intensity has value P1 corresponds to a downstream end of the downstream radiation portion 54.

In this preferred embodiment, the irradiation region by the light radiation device 50 refers to, in a narrow sense, a region, of the medium M, that has a predetermined radiation intensity (in this example, value P1) or higher when being irradiated with the light. In a broad sense, the irradiation region by the light radiation device 50 refers to a region, of the medium M, that is irradiated with the light radiating from the light radiation device 50.

In the case where the radiation portions 52, 53 and 54 of the light radiation device 50 are all turned on, the radiation intensity has value P1 at position A1 and position A2. At position A1 and in the vicinity thereof and at position A2 and in the vicinity thereof, the radiation intensity exhibits a relatively steep change (in this example, the gradient of curve G1 at positions A1 and A2). A reason for this is that as shown in FIG. 3, the case 50C of the light radiation device 50 suppresses or prevents the light from leaking to the outside of the irradiation region (in other words, the region, of the medium M, that faces the light radiation device 50). For this reason, merely a small amount of light leaks to the outside of the irradiation region.

In FIG. 6, curve G2 represents the light radiation intensity in the case where the downstream radiation portion 54 is turned on whereas the upstream radiation portion 52 and the middle radiation portion 53 are turned off. In the case of curve G2, position A2, on the downstream side of the light radiation device 50, at which the radiation intensity has value P1 corresponds to the downstream end of the downstream radiation portion 54. The change in the radiation intensity at position A2 (i.e., the gradient of curve G2 at position A2) is the same as on curve G1 and is relatively steep. Therefore, merely a small amount of light leaks to a region downstream with respect to the downstream radiation portion 54.

By contrast, in the case of curve G2, position A3, on the upstream side of the light radiation device 50, at which the radiation intensity has value P1 is in the middle radiation portion 53. The change in the radiation intensity at position A3 (namely, the gradient of curve G2 at position A3) is milder than the change at position A2. A reason for this is that as shown in FIG. 4, there is no light-blocking component, like the case 50C, between the middle radiation portion 53 and the downstream radiation portion 54, and therefore, the light radiating from the downstream radiation portion 54 leaks to a region upstream with respect to the downstream radiation portion 54 (namely, a region facing the middle radiation portion 53). For this reason, as shown in FIG. 6, a region upstream with respect to the downstream radiation portion 54 is irradiated with a relatively large amount of light, which is larger than the amount of light leaking to the region downstream with respect to the downstream radiation portion 54.

In FIG. 6, curve G3 represents the light radiation intensity in the case where the upstream radiation portion 52 and the downstream radiation portion 54 are turned on whereas the middle radiation portion 53 is turned off. Curve G1 and curve G3 overlap each other in a portion on the upstream side of the upstream radiation portion 52 and a portion on the downstream side of the downstream radiation portion 54.

In the case of curve G3, the light radiation intensity is highest in a central portion 52*b* of the upstream radiation portion 52 and in a central portion of the downstream radiation portion 54. The light radiation intensity is decreased as being farther from the central portion 52*b* of the upstream radiation portion 52 and from the central portion of the downstream radiation portion 54. The light radiation intensity in each of an upstream portion 52*a* and a downstream portion 52*c* of the upstream radiation portion 52 is lower than the light radiation intensity in the central portion 52*b*.

In this preferred embodiment, each of the printing modes will be specifically described regarding 4-path printing as an example. Thus, the upstream radiation portion 52 is divided into four (for example, equally divided into four) in the transportation direction X in correspondence with a state where the nozzle arrays 44 in the 4-path printing are conceptually divided into four divided nozzle arrays 441 through 444. The upstream portion 52*a* is the most upstream portion among the four divided portions of the upstream radiation portion 52 in the transportation direction X, and the downstream portion 52*c* is the most downstream portion among the four divided portions. The central portion 52*b* is a portion of the upstream radiation portion 52 other than the upstream portion 52*a* and the downstream portion 52*c*.

As shown in FIG. 6, in the case of curve G3, the radiation intensity is lower than value P1 in a central portion of the middle radiation portion 53. In the case of curve G3, the change in the light radiation intensity at each of position A4 at an upstream end of the middle radiation portion 53 and position A5 at a downstream end of the middle radiation portion 53 is milder than the change at position A1. A reason for this is that the light leaks from the upstream radiation portion 52 and also from the downstream radiation portion 54.

Figure 7:
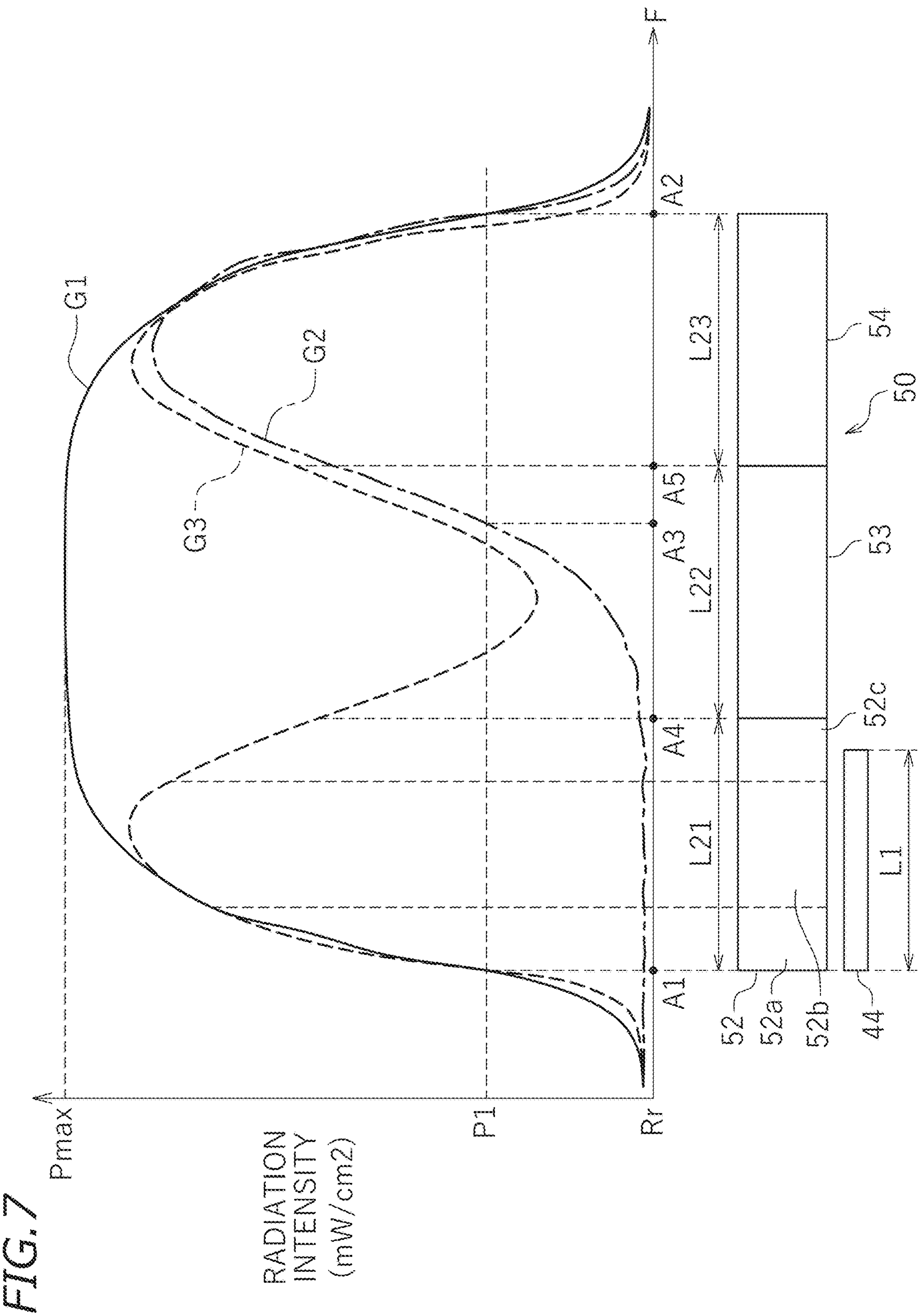
FIG. 7 is a graph showing the relationship between the light radiation intensity with respect to various portions in the transportation direction of the light radiation device, and various portions of the nozzle array.

FIG. 7 is a graph showing the relationship between the light radiation intensity with respect to various portions in the transportation direction X of the light radiation device 50 and various portions of the nozzle arrays 44. FIG. 7 shows the positional relationship between the light radiation device 50 and the nozzle array 44. The curves in FIG. 7 are the same as the curves in FIG. 6.

As shown in FIG. 7, the position in the transportation direction X of an upstream end of the nozzle arrays 44 (in other words, the most upstream nozzles 45 among the plurality of nozzles 45 included in the nozzle arrays 44) is the same as the position of an upstream end of the light radiation device 50, namely, the position in the transportation direction X of the upstream end of the upstream radiation portion 52. Therefore, the light radiation intensity of the light radiation portion 50 at the upstream end of the nozzle arrays 44 is set to be value P1. In this preferred embodiment, the nozzle arrays 44 are located to be aligned with the upstream radiation portion 52 in the scanning direction Y. Length L21 of the upstream radiation portion 52 is slightly longer than length L1 of the nozzle arrays 44, and the upstream radiation portion 52 is located so as to encompass a region corresponding to the nozzle arrays 44 in the transportation direction X. In the case where the upstream radiation portion 52 is turned on, a path printing region to be printed with the nozzle array 44 is irradiated with light having a radiation intensity of value P1 or higher. Namely, in the case where the upstream radiation portion 52 is turned on, the region to be printed with the nozzle array 44, namely, the region where the ink dots are to be formed with the nozzle array 44, is irradiated with light capable of curing the photocurable ink.

In this preferred embodiment, the position of the downstream end of the nozzle arrays 44 (in other words, the most downstream nozzles 45 among the plurality of nozzles 45 included in the nozzle arrays 44) is set to be upstream with respect to a border between the upstream radiation portion 52 and the middle radiation portion 53. At least a portion on the downstream side of the upstream radiation portion 52 is located downstream in the transportation direction X with respect to the downstream end of the nozzle arrays 44. The middle radiation portion 53 is located downstream with respect to the downstream end of the nozzle arrays 44, with a gap being provided from the downstream end of the nozzle arrays 44. Therefore, in the case where the upstream radiation portion 52 is turned on and the middle radiation portion 53 is turned off, the value of the light radiation intensity at the downstream end of the nozzle arrays 44 is lower than the maximum value Pmax but is higher than value P1.

In this preferred embodiment, the upstream radiation portion 52, the middle radiation portion 53 and the downstream radiation portion 54 of the light radiation device 50 may each be controlled to be turned on or off while the color nozzle array 44*a*, the while nozzle array 44*b*, the clear nozzle array 44*c* and the primer nozzle array 44*d* may each be controlled to eject or not to eject the ink, so that various printing modes are realized.

Hereinafter, each of the printing modes will be described by way of the 4-path printing among different types of multi-path printing. With the 4-path printing, four path operations are performed to eject ink onto the same position four times. In the case of the 4-path printing, the amount of transportation of the medium M in the transportation operation (transportation amount) is ¼ of length L1 in the transportation direction X of the nozzle arrays 44. For example, in FIG. 8A and the like, a path printing region AR100 is a region onto which the ink is ejected from the nozzle array 44 by one path operation.

In this example, the path printing region AR100 is divided in the transportation direction X into four divided regions AR101 through AR104. In this example, the nozzle arrays 44 are each divided in the transportation direction X into four, namely, the divided nozzle arrays 441 through 444 from the upstream side. In the case of the 4-path printing, the printing is performed four times for each of the divided regions AR101 through AR104. For example, in FIG. 8A, the divided regions AR101, AR102, AR103 and AR104 are respectively regions onto which the path operation has been performed once, twice, three times and four times. For example, the divided region AR104, onto which four path operations have been performed has been transported downstream sequentially from the position of the divided region AR101 by a plurality of transportation operations. In the first path operation on this divided region, ink is ejected from the divided nozzle array 441 onto the position of the divided region AR101 in FIG. 8A. Then, this divided region is moved to the position of the divided region AR102 in FIG. 8A by the transportation operation. In the second path operation, ink is ejected from the divided nozzle array 442 onto the position of the divided region AR102 in FIG. 8A. Similarly, in the third path operation and the fourth path operation each performed after the transportation operation, ink is ejected from the divided nozzle arrays 443 and 444 onto the positions of the divided regions AR103 and AR104 in FIG. 8A, respectively.

Figure 8A:
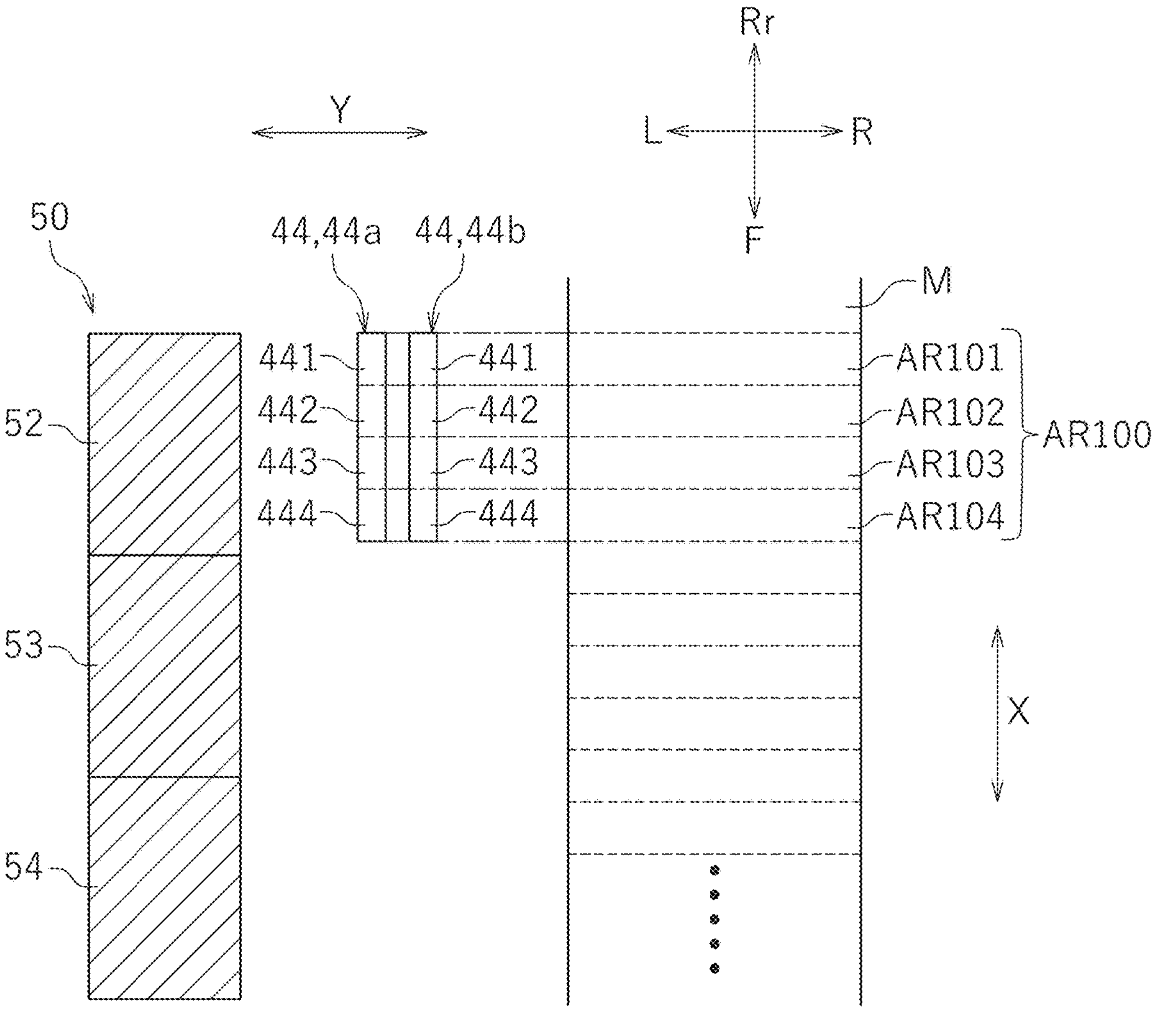
FIG. 8A is a plan view conceptually showing the light radiation device, a color nozzle array, a white nozzle array and the medium in a color printing mode.

In the case of the 4-path printing, the divided region AR101 in FIG. 8A is the region where the printing has been performed by one path (fourth path). In the case of the 4-path printing, about ¼ of the ink dots are formed on the divided region AR101. The divided region AR102 in FIG. 8A is the region where the printing has been performed by two paths (third and fourth paths). In the case of the 4-path printing, about a half of the ink dots are formed on the divided region AR102. The divided region AR103 in FIG. 8A is the region where the printing has been performed by three paths (second, third and fourth paths). In the case of the 4-path printing, about ¾ of the ink dots are formed on the divided region AR104. The divided region AR104 in FIG. 8A is the region where the printing has been performed by four paths (first through fourth paths). The ink dots formed by each of all the paths (first through fourth paths) are dispersed on the divided region AR104 in the transportation direction X. As can be seen, the multi-path printing has a feature that the dots formed by each path are dispersed in the transportation direction X. In the case of the 4-path printing, all the dots to be formed on the divided region AR104 are formed. In the case of the 4-path printing, the amount of transportation of the medium M in the transportation operation (transportation amount) is about ¼ of the length in the transportation direction X of the printing region. Therefore, in the case where the ink is ejected from all the nozzles 45 in the nozzle array 44 in the 4-path printing, the length of transportation of the medium M during the transportation operation is about ¼ of length L1 of the nozzle arrays 44.

Now, the printing modes executable by the printing device 1 according to this preferred embodiment will be described sequentially. In this preferred embodiment, the color printing mode, the gloss printing mode, the flat color printing mode or the primer printing mode may be selected as the printing mode. In this preferred embodiment, the printing mode setter 62 (see FIG. 2) of the controller 60 sets the printing mode to be executed by the printing device 1. The printing mode setter 62 sets the printing mode selected by the user as the printing mode to be executed by the printing device 1.

For example, a screen by which the printing mode is to be selected is displayed on the display screen 111 connected with the computer 110 shown in FIG. 1. The user operates the input device 112 to select one printing mode from the color printing mode, the gloss printing mode, the flat color printing mode and the primer printing mode. Next, the computer 110 generates a printing mode instruction code regarding the printing mode selected by the user, and transmits the printing mode instruction code to the printing device 1. The printing mode setter 62 sets the printing mode in accordance with the printing mode instruction code as the printing mode to be executed by the printing device 1.

Hereinafter, the color printing mode, the gloss printing mode, the flat color printing mode and the primer printing mode will be described in this order. In FIG. 8A, FIG. 9A, FIG. 10A and FIG. 13A, hatching in the upstream radiation portion 52, the middle radiation portion 53 or the downstream radiation portion 54 indicates that the corresponding radiation portion is turned on. By contrast, non-hatching in the upstream radiation portion 52, the middle radiation portion 53 or the downstream radiation portion 54 indicates that the corresponding radiation portion is turned off.

Figure 8B:
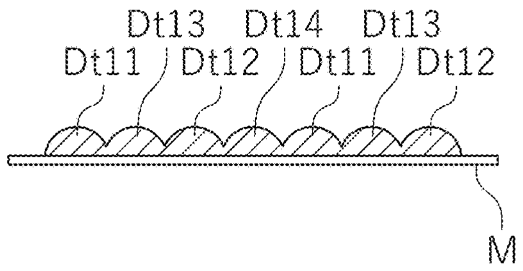
FIG. 8B shows a state of dots of ink in the color printing mode.

FIG. 8A is a plan view conceptually showing the light radiation device 50, the color nozzle array 44*a*, the white nozzle array 44*b* and the medium M in the color printing mode. FIG. 8B shows a state of ink dots in the color printing mode. In the color printing mode, the color printing controller 71 (see FIG. 2) of the controller 60 executes the control. The color printing controller 71 executes the control such that the path operation by the color path controller 81 and the transportation operation by the transportation controller 64 are performed alternately. The color printing controller 71 also executes the control such that while the color path controller 81 is controlling the path operation, the second light radiation controller 66 controls the light sources 50A of the light radiation device 50 to be turned on or off. The control on the light radiation device 50 by the second light radiation controller 66 may be executed also during the transportation operation.

In the color printing mode, as shown in FIG. 8A, the second light radiation controller 66 controls the light radiation device 50 to turn on the upstream radiation portion 52, the middle radiation portion 53 and the downstream radiation portion 54. Therefore, the light radiation intensity has the distribution represented by curve G1 in FIG. 6.

In the color printing mode, the color path controller 81 executes the control such that the color ink is ejected from the nozzles 45 of the color nozzle array 44*a* and the white ink is ejected from the nozzles 45 of the white nozzle array 44*b*. The ejection of the color ink from the nozzles 45 of the color nozzle array 44*a* and the ejection of the white ink from the nozzles 45 of the white nozzle array 44*b* may be performed at the same time (hereinafter, referred to as “simultaneous ejection”) or may not be performed with simultaneous ejection. For example, the ink may be ejected from either the nozzles 45 of the color nozzle array 44*a* or the nozzles 45 of the white nozzle array 44*b* in accordance with the path operation. Alternatively, so-called layer printing may be performed. For example, the white ink is ejected onto the divided regions AR101 and AR102, and the color ink is ejected onto the divided regions AR103 and AR104. Alternatively, the color ink may be ejected onto the divided regions AR101 and AR102, and the white ink may be ejected onto the divided regions AR103 and AR104.

The ink dots are formed with the color ink and the white ink on the divided regions AR101 through AR104 by one path operation performed under the control of the color path controller 81, and the ink dots are irradiated with light radiating from the upstream radiation portion 52 immediately after landing on the divided regions AR101 through AR104. As a result, the ink dots that have landed on the medium M are cured or semi-cured.

In FIG. 8B, the ink dots that have formed by the first, second, third and fourth path operations are respectively referred to dots Dt11, Dt12, Dt13 and Dt14. On each of the divided regions AR102 through AR104, ink dots are formed on a region by one path operation, and then further ink dots are formed on such a region where the ink dots are formed by the immediately previous path operation. For example, on the divided region AR102, the ink dots Dt12 are formed between the ink dots Dt11 formed by the first path operation. The ink dots formed by the immediately previous path operation have been cured or semi-cured as a result of being irradiated with light immediately after landing on the medium M. Therefore, when the ink dots Dt12 through Dt14 are formed on the divided regions AR102 through AR104, the ink dots Dt11 through Dt14 do not run into each other easily.

In the color printing mode in this preferred embodiment, the second light radiation controller 66 controls the middle radiation portion 53 and the downstream radiation portion 54, in addition to the upstream radiation portion 52, to be turned on. As a result, the ink dots that have landed on the medium M are further cured with light radiating from the middle radiation portion 53 and the downstream radiation portion 54. It should be noted that in the case where the energy of the light radiating from the upstream radiation portion 52 is sufficient to cure the ink dots, the middle radiation portion 53 and the downstream radiation portion 54 may be turned off.

In this preferred embodiment, as shown in FIG. 7, at least a portion on the downstream side of the upstream radiation portion 52 is located downstream with respect to the downstream end of the nozzle arrays 44 (in more detail, the color nozzle array 44*a* and the white nozzle array 44*b*). Therefore, even in the case where the middle radiation portion 53 and the downstream radiation portion 54 are turned off, the radiation intensity at the downstream end of the nozzle arrays 44 is higher than value P1. For this reason, the divided region AR104 is also irradiated with light of a relatively high radiation intensity, and thus the ink dots are easily cured.

In this preferred embodiment, there is no component, like the case 50C, that blocks light at the border between the upstream radiation portion 52 and the middle radiation portion 53. Therefore, even in the case where the middle radiation portion 53 and the downstream radiation portion 54 are turned off, the light radiating from the upstream radiation portion 52 leaks to a region downstream with respect to the upstream radiation portion 52. For this reason, even in the case where the divided region AR104 is moved downstream after all the ink dots to be formed in the printing region are formed, namely, after the 4-path printing is completed, the ink dots may be further cured.

Figure 9A:
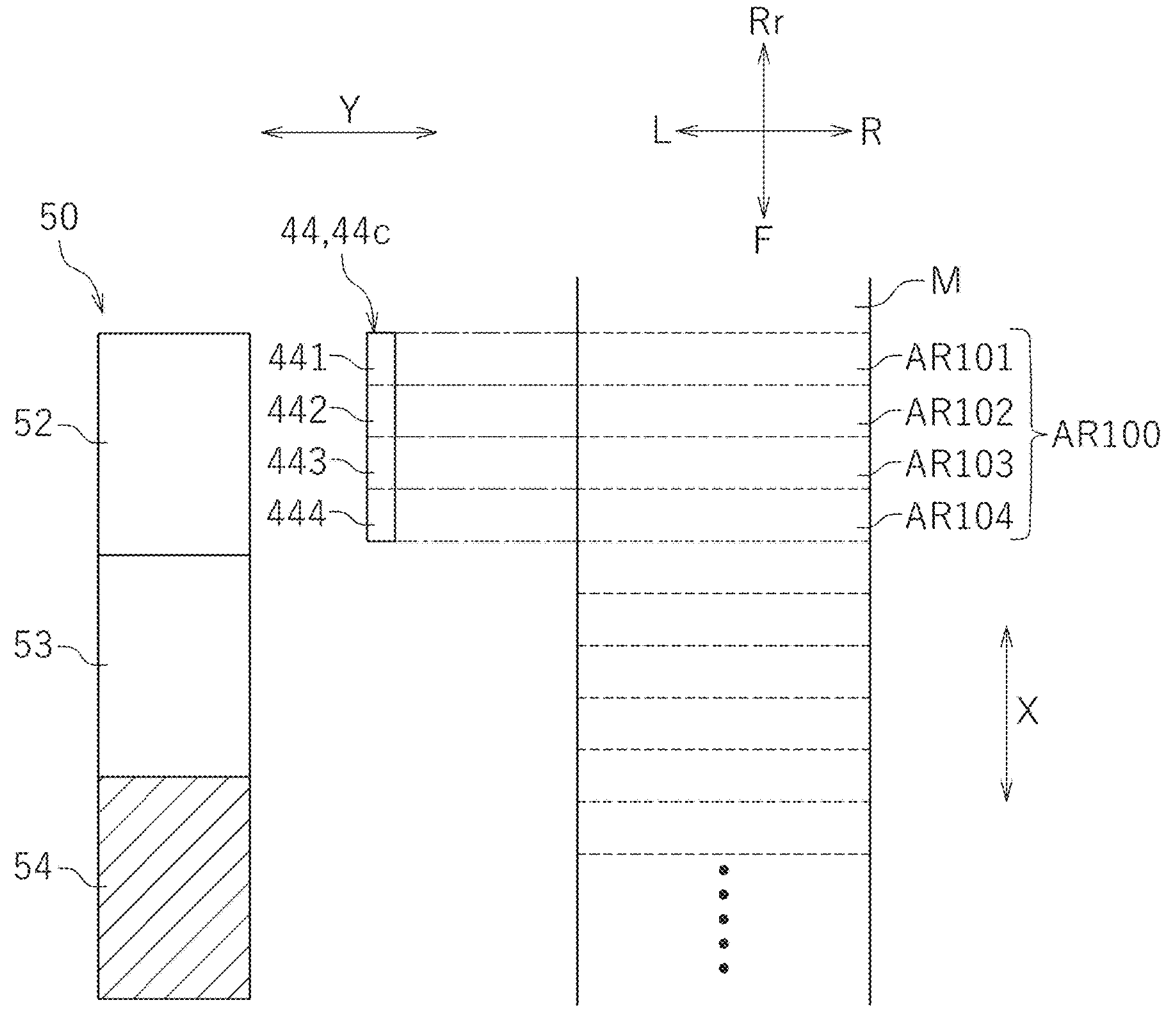
FIG. 9A is a plan view conceptually showing the light radiation device, a clear nozzle array and the medium in a gloss printing mode.
Figure 9B:
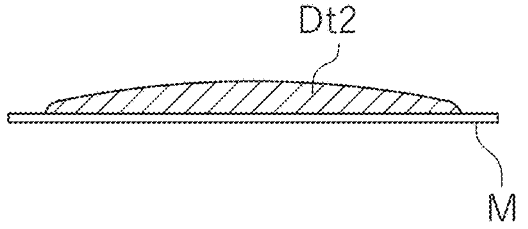
FIG. 9B shows a state of dots of clear ink in the gloss printing mode.

Now, the gloss printing mode will be described. FIG. 9A is a plan view conceptually showing the light radiation device 50, the clear nozzle array 44*c* and the medium M in the gloss printing mode. FIG. 9B shows a state of dots of the clear ink in the gloss printing mode. In the gloss printing mode, the gloss printing controller 73 (see FIG. 2) of the controller 60 executes the control. The gloss printing controller 73 executes the control such that the path operation by the clear path controller 83 and the transportation operation by the transportation controller 64 are performed alternately. The gloss printing controller 73 also executes the control such that while the clear path controller 83 is controlling the path operation, the third light radiation controller 67 controls the light sources 50A of the light radiation device 50 to be turned on or off. The control by the third light radiation controller 67 may be executed also during the transportation operation.

In the gloss printing mode, as shown in FIG. 9A, the third light radiation controller 67 controls the light radiation device 50 to turn off the upstream radiation portion 52 and the middle radiation portion 53 and to turn on the downstream radiation portion 54. Therefore, the light radiation intensity has the distribution represented by curve G2 in FIG. 6.

In the gloss printing mode, the clear path controller 83 executes the control such that the clear ink is ejected from the nozzles 45 of the clear nozzle array 44*c* in the path operation.

In the gloss printing mode, the clear ink dots are formed on the divided regions AR101 through AR104 under the control of the clear path controller 83. In the gloss printing mode, the upstream radiation portion 52 is turned off. Therefore, the clear ink dots are not irradiated with light almost at all immediately after landing on the divided regions AR101 through AR104, and thus are not cured easily. As a result, the clear ink dots are gradually spread while being wet on the medium M and thus are flattened.

On each of the divided regions AR102 through AR104, clear ink dots are formed on a region by one path operation, and then further clear ink dots are formed on such a region where the clear ink dots are formed by the immediately previous path operation. However, the clear ink dots formed by the immediately previous path operation are uncured. Therefore, when the further clear ink dots are formed on the divided regions AR102 through AR104, the uncured ink dots are mixed together and coupled with each other. When the adjacent clear ink dots are coupled with each other, surfaces of the coupled ink dots are flattened.

As a result, when all the clear ink dots to be formed on the divided region AR104 are formed, a film Dt2 of the clear ink dots (glossy film, glossy layer) having a flat surface (see FIG. 9B) is formed. When the divided region AR104 is moved downstream, the clear ink film Dt2 having the flat surface is irradiated with the light from the downstream radiation portion 54 and thus is cured. As a result, a glossy layer of the clear ink having a flat surface is formed on the medium M.

Figure 10A:
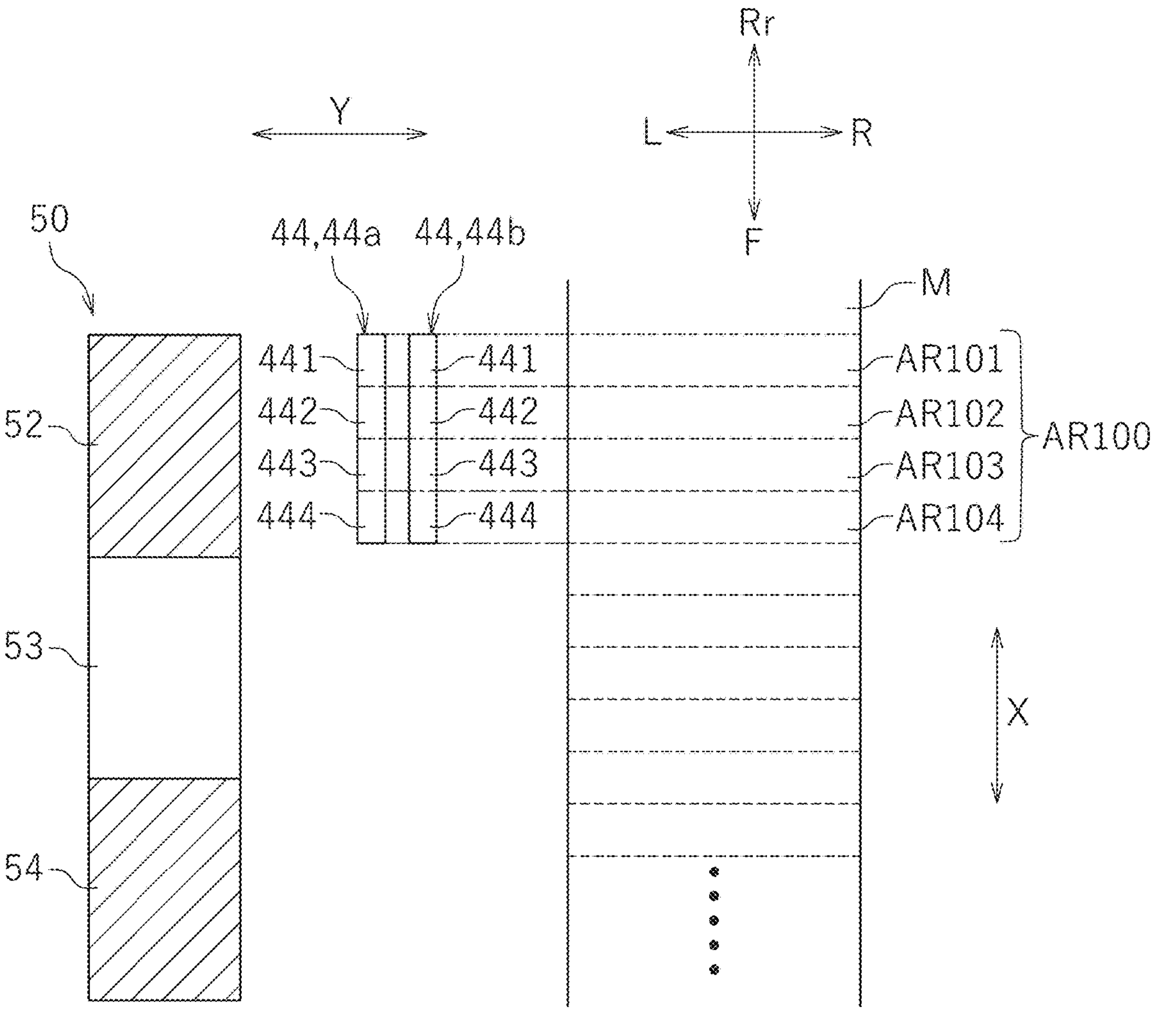
FIG. 10A is a plan view conceptually showing the light radiation device, the color nozzle array, the white nozzle array and the medium in a flat color printing mode.
Figure 10B:
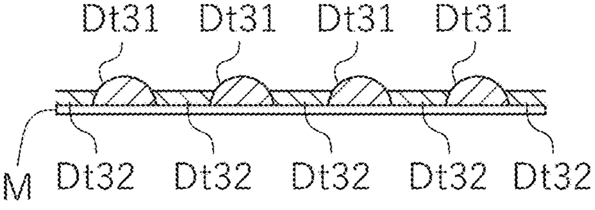
FIG. 10B shows a state of dots of ink in the flat color printing mode.

Now, the flat color printing mode will be described. FIG. 10A is a plan view conceptually showing the light radiation device 50, the color nozzle array 44*a*, the white nozzle array 44*b* and the medium M in the flat color printing mode. FIG. 10B shows a state of ink dots in the flat color printing mode. In the flat color printing mode, the ink dots cured immediately after landing on the medium M and the ink dots flattened and then cured are present in a mixed manner to perform color printing.

In the flat color printing mode, the flat color printing controller 75 (see FIG. 2) of the controller 60 executes the control. The flat color printing controller 75 executes the control such that the path operation by the color path controller 81 and the transportation operation by the transportation controller 64 are performed alternately. The flat color printing controller 75 also executes the control such that while the color path controller 81 is controlling the path operation, the first light radiation controller 65 controls the light sources 50A of the light radiation device 50 to be turned on or off. The control by the first light radiation controller 65 may be executed also during the transportation operation.

In the flat color printing mode, as shown in FIG. 10A, the first light radiation controller 65 controls the light radiation device 50 to turn on the upstream radiation portion 52, to turn off the middle radiation portion 53, and to turn on the downstream radiation portion 54. The pattern in which, for example, the upstream radiation portion 52 is turned on, the middle radiation portion 53 is turned off, and the downstream radiation portion 54 is turned on corresponds to an "on/off pattern". In the flat color printing mode, the light radiation intensity has the distribution represented by curve G3 in FIG. 6.

In the flat color printing mode, the color path controller 81 executes the control such that the color ink is ejected from the color nozzle array 44*a* and the white ink is ejected from the white nozzle array 44*b* in each path operation, and such ejection is not limited to the simultaneous ejection, like in the color printing mode.

Figure 11A:
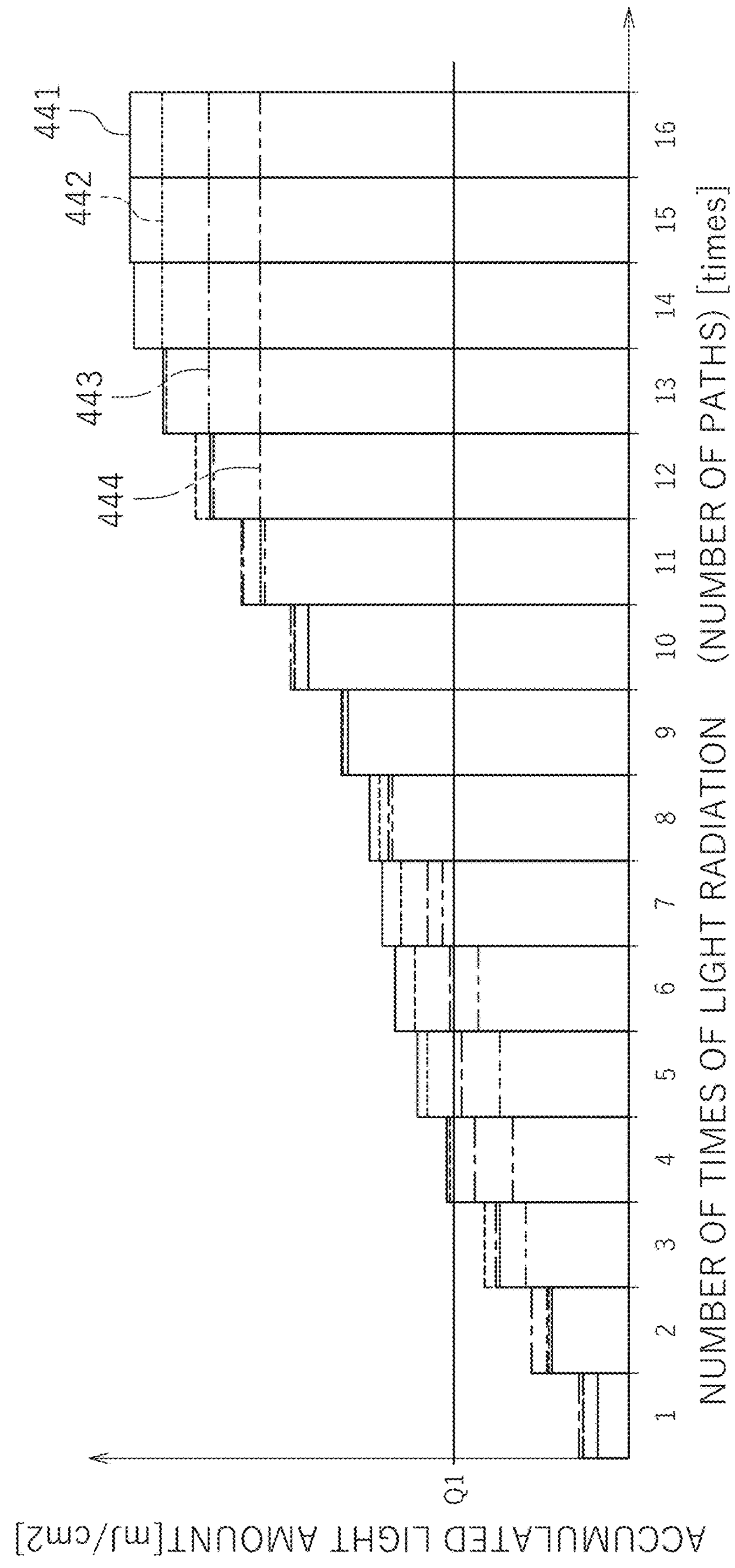
FIG. 11A is a graph showing the accumulated light amount with respect to the number of paths of the ink ejected from divided nozzle arrays in the flat color printing mode.
Figure 11B:
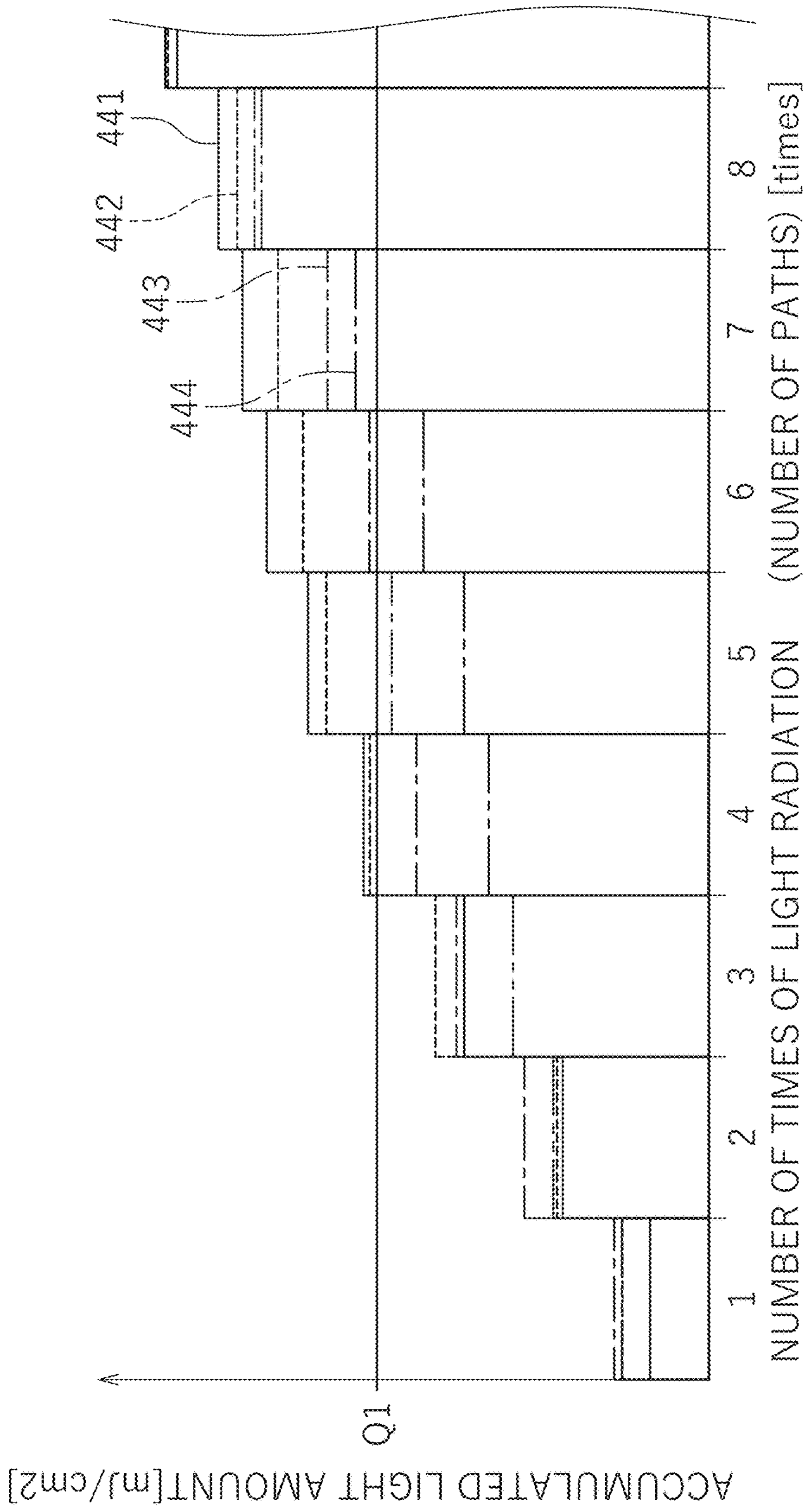
FIG. 11B is a graph showing first through eighth paths in FIG. 11A in enlargement.
Figure 12A:
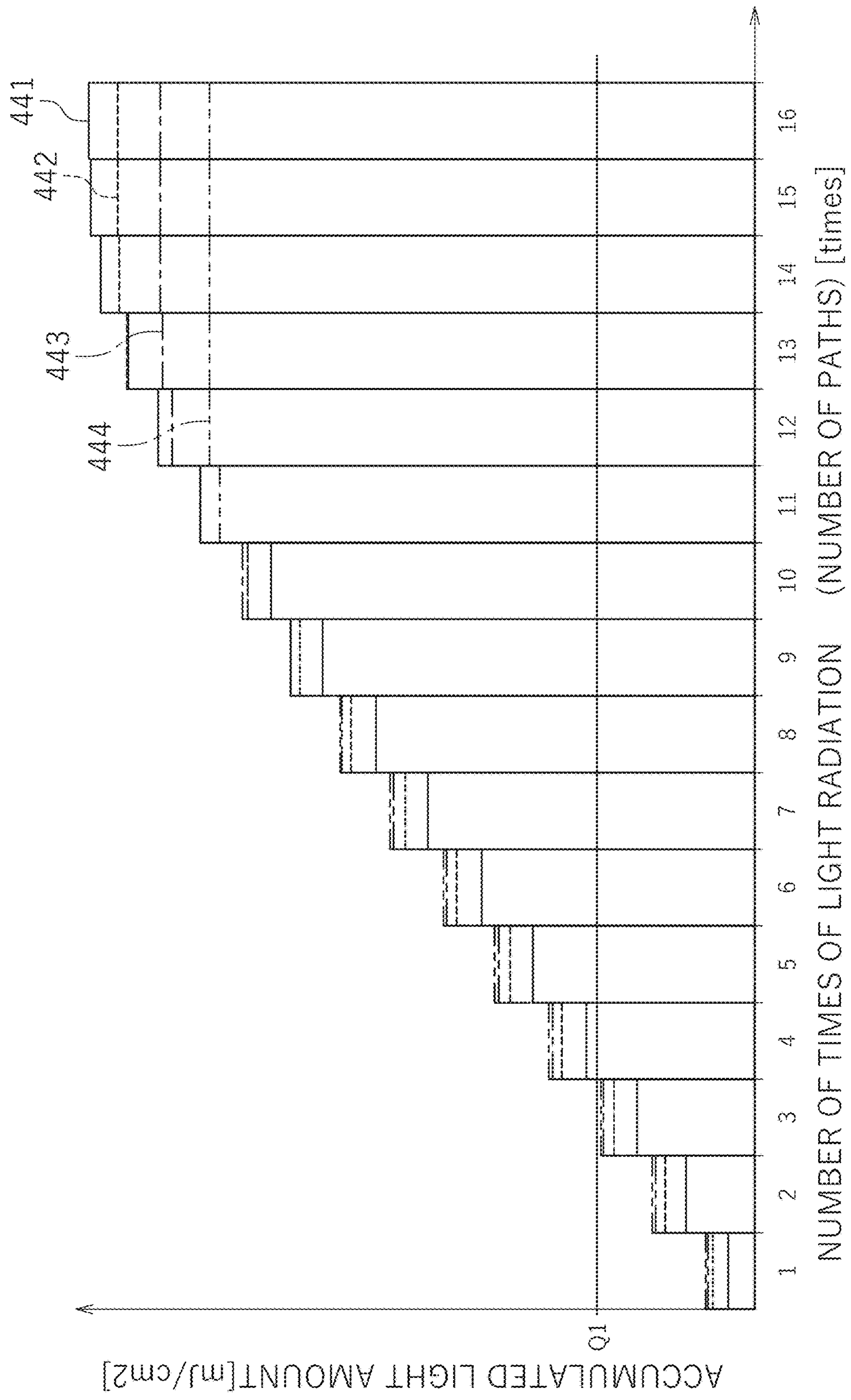
FIG. 12A is a graph showing the accumulated light amount with respect to the number of paths of the ink ejected from the divided nozzle arrays in the color printing mode.
Figure 12B:
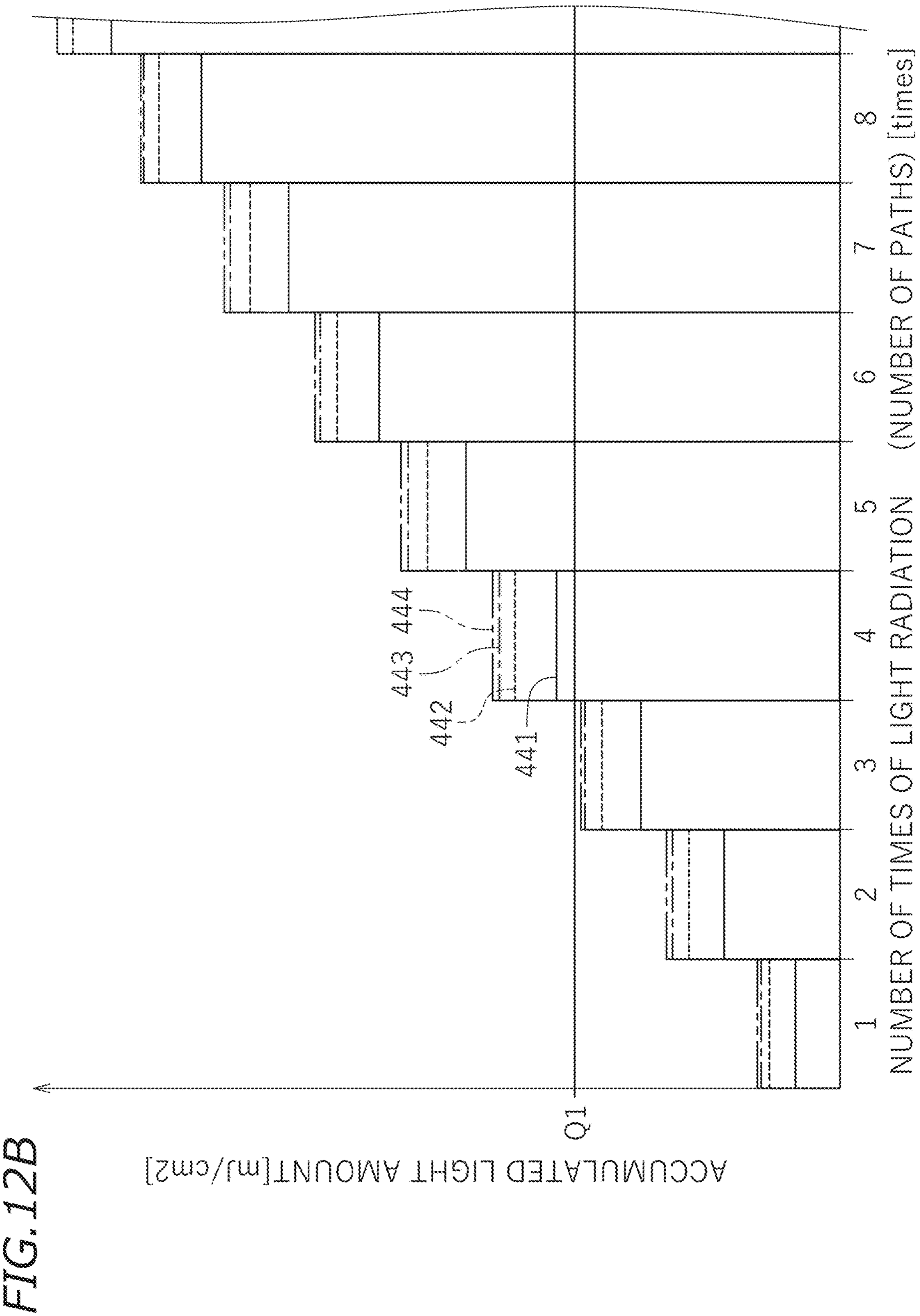
FIG. 12B is a graph showing first through eighth paths in FIG. 12A in enlargement.

FIG. 11A is a graph showing the accumulated light amount with respect to the number of paths performed for the ink ejected from each of the divided nozzle arrays 441 through 444 in the flat color printing mode. FIG. 11B is a graph showing first through eighth paths in FIG. 11A in enlargement. FIG. 12A is a graph showing the accumulated light amount in accordance with the number of paths performed for the ink ejected from each of the divided nozzle arrays 441 through 444 in the color printing mode. FIG. 12B is a graph showing first through eighth paths in FIG. 12A in enlargement. In FIG. 11A, FIG. 11B, FIG. 12A and FIG. 12B, value Q1 of the accumulated light amount is the minimum light amount required to cure the ink.

For example, in the color printing ink, as shown in FIG. 12B, the accumulated light amount provided for the ink ejected from the divided nozzle array 441 is smaller than value Q1 until the third path, and exceeds value Q1 at the fourth path. Therefore, in the color printing mode, the ink ejected from the divided nozzle array 441 is cured at the fourth path. Similarly, the accumulated light amount provided for the ink ejected from each of the divided nozzle arrays 442 through 444 is smaller than value Q1 until the third path, and exceeds value Q1 at the fourth path. Therefore, the ink ejected from each of the divided nozzle arrays 442 through 444 is also cured at the fourth path.

The number of paths required for the ink to be cured is the time period required for the ink to be cured. The manner in which the ink dots are spread while being wet varies in accordance with the number of paths required for the ink to be cured. In this example, as the number of paths required for the ink to be cured is larger, the ink dots are more easily spread while being wet. In the color printing mode, the number of paths required for the ink ejected from the divided nozzle arrays 441 through 444 to be cured is relatively small, and such a number of paths is the same for the ink ejected from all the divided nozzle arrays 441 through 444. Therefore, the ink dots are like ink dots Dt11 through Dt14 shown in FIG. 8B.

By contrast, in the flat color printing mode, as shown in FIG. 11B, the number of paths required for the accumulated light amount provided for the ink to reach value Q1 varies in accordance with from which divided nozzle array, among the divided nozzle arrays 441 through 444, the ink is ejected. In this example, the accumulated light amount provided for the ink ejected from each of the divided nozzle arrays 441 and 442 is smaller than value Q1 until the third path, and exceeds value Q1 at the fourth path. Therefore, the ink ejected from the divided nozzle arrays 441 and 442 is cured at the fourth path. By contrast, the accumulated light amount provided for the ink ejected from the divided nozzle array 443 is smaller than value Q1 until the fifth path, and exceeds value Q1 at the sixth path. Therefore, the ink ejected from the divided nozzle array 443 is cured at the sixth path. The accumulated light amount provided for the ink ejected from the divided nozzle array 444 is smaller than value Q1 until the sixth path, and exceeds value Q1 at the seventh path. Therefore, the ink ejected from the divided nozzle array 444 is cured at the seventh path.

As described above, in the flat color printing mode, the paths at which the ink ejected from the divided nozzle arrays 441, 442, 443 and 444 is cured are respectively the fourth path, the fourth path, the sixth path and the seventh path. The time period required for the ink to be cured varies in accordance with from which divided nozzle array, among the divided nozzle arrays 441 through 444, the ink is ejected. A conceivable reason for this is that the light radiation intensity has the distribution represented by curve G3 in FIG. 6. In the flat color printing mode, the ink ejected from the divided nozzle arrays 441 and 442 is irradiated with light having a high radiation intensity from the central portion 52*b* of the upstream radiation portion 52 and then is irradiated with light having a low radiation intensity from the middle radiation portion 53. Therefore, the accumulated light amount for the ink ejected from the divided nozzle arrays 441 and 442 reaches value Q1 with a small number of paths. By contrast, the ink ejected from the divided nozzle array 444 is irradiated with light having a relatively low radiation intensity from the downstream portion 52*c* of the upstream radiation portion 52 and the middle radiation portion 53 without being irradiated with light having a high radiation intensity from the central portion 52*b* of the upstream radiation portion 52. Therefore, the accumulated light amount for the ink ejected from the divided nozzle array 444 reaches value Q1 with a larger number of paths than the number of paths for the ink ejected from the divided nozzle arrays 441 and 442.

In the flat color printing mode, the dots of the ink ejected from the divided nozzle arrays 441 and 442 are cured with a small number of paths, namely, within a short time period. Therefore, the ink dots are like, for example, ink dots Dt31 shown in FIG. 10B. By contrast, the dots of the ink ejected from the divided nozzle array 444 are cured with a large number of paths, namely, after a long time period. Therefore, the ink dots are easily spread while being wet, and are flattened like, for example, ink dots Dt32 shown in FIG. 10B. As a result, a color image having a flat surface is formed on the medium M.

Figure 13A:
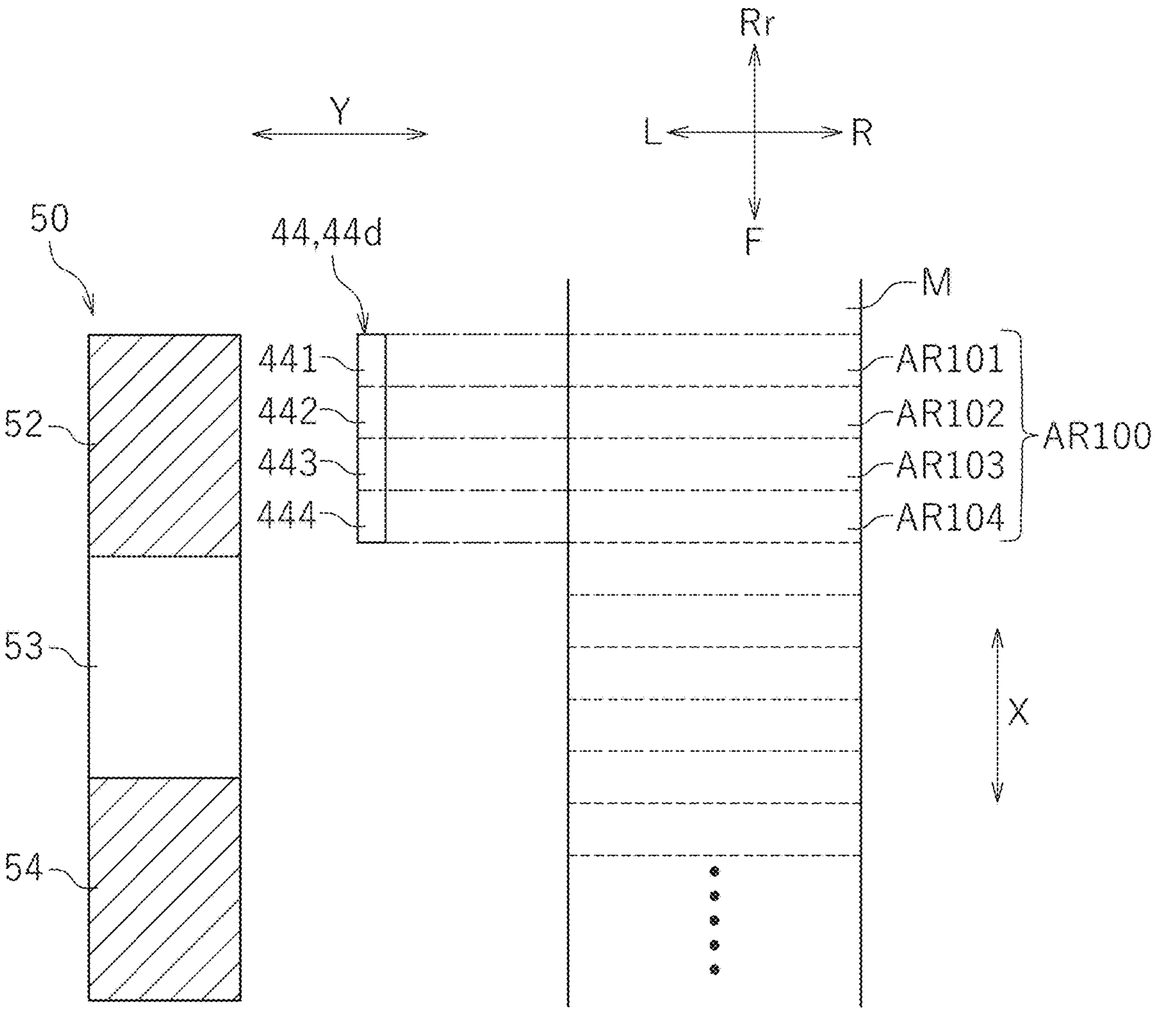
FIG. 13A is a plan view conceptually showing the light radiation device, a primer nozzle array and the medium in a primer printing mode.
Figure 13B:
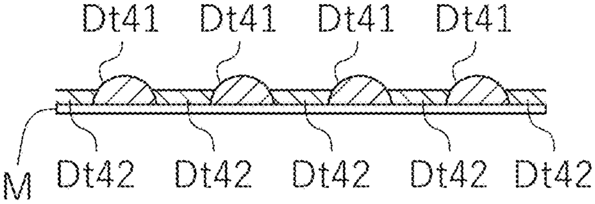
FIG. 13B shows a state of dots of primer ink in the primer printing mode.

Now, a primer printing mode will be described. FIG. 13A is a plan view conceptually showing the light radiation device 50, the primer nozzle array 44*d* and the medium M in the primer printing mode. FIG. 13B shows a state of dots of the primer ink in the primer printing mode. In the primer printing mode, the primer ink dots cured immediately after landing on the medium M and the primer ink dots flattened and then cured are present in a mixed manner to perform primer printing.

In the primer printing mode, the primer printing controller 77 (see FIG. 2) of the controller 60 executes the control. The primer printing controller 77 executes the control such that the path operation by the primer path controller 85 and the transportation operation by the transportation controller 64 are performed alternately. The primer printing controller 77 also executes the control such that while the primer path controller 85 is controlling the path operation, the first light radiation controller 65 controls the light sources 50A of the light radiation device 50 to be turned on or off. The control by the first light radiation controller 65 may be executed also during the transportation operation.

In the primer printing mode, as shown in FIG. 13A, the first light radiation controller 65 controls the light radiation device 50 to turn on the upstream radiation portion 52, to turn off the middle radiation portion 53, and to turn on the downstream radiation portion 54. In the primer printing mode, the light radiation intensity has the distribution represented by curve G3 in FIG. 6.

In the primer printing mode, the primer path controller 85 executes the control such that the primer ink is ejected from the primer nozzle array 44*d* in each path operation.

FIG. 11A and FIG. 11B may each be considered to be a graph showing the accumulated light amount in the primer printing mode. In the primer printing mode, like in the flat color printing mode, the number of paths required for the ink ejected from the divided nozzle arrays 441 and 442 to be cured is small (e.g., four paths). The number of paths required for the ink ejected from the divided nozzle array 444 to be cured is large (e.g., seven paths). The number of paths required for the ink ejected from the divided nozzle array 443 to be cured is between these numbers of paths (e.g., six paths). As can be seen, in the primer printing mode, the dots of the ink ejected from the divided nozzle arrays 441 and 442 are cured with a small number of paths, namely, within a short time period. Therefore, the ink dots are like, for example, ink dots Dt41 shown in FIG. 13B. By contrast, in the primer printing mode, the dots of the ink ejected from the divided nozzle array 444 are cured with a large number of paths, namely, after a long time period. Therefore, the ink dots are easily spread while being wet, and are flattened like, for example, ink dots Dt42 shown in FIG. 13B. As a result, a primer ink layer having a flat surface is formed on the medium M.

As described above, in this preferred embodiment, the upstream radiation portion 52 is turned on whereas the middle radiation portion 53 is turned off. Therefore, as represented by curve G3 in FIG. 7, the light radiation intensity of light from the central portion 52*b* of the upstream radiation portion 52 is high whereas the light radiation intensity of light from the downstream portion 52*c* of the upstream radiation portion 52 is relatively low. For this reason, the ink ejected from an upstream portion and a central portion of the nozzle arrays 44 is irradiated with light having a high radiation intensity from the central portion 52*b* of the upstream radiation portion 52, and thus is cured. By contrast, the ink ejected from a downstream portion of the nozzle arrays 44 is irradiated with light having a low radiation intensity from the downstream portion 52*c* of the upstream radiation portion 52, and thus is semi-cured without being cured completely. The semi-cured ink is not cured completely, and thus is spread while being wet and has a surface thereof flattened, until being irradiated with light from the downstream radiation portion 54. Then, the flattened ink is irradiated with the light from the downstream radiation portion 54 and is cured. According to this preferred embodiment, the time period required for the ink ejected from the nozzle arrays 44 to be cured may be adjusted step by step, so that a glossier printing image is printed on the medium M than in the case where the radiation portions 52 through 54 are all turned on.

In this preferred embodiment, in the flat color printing mode, as shown in FIG. 10A, the color path controller 81 controls the path operation such that the process color ink is ejected from the color nozzle array 44*a* and the white ink is ejected from the white nozzle array 44*b*. While the path operation is performed under the control of the color path controller 81, the first light radiation controller 65 controls the light radiation device 50 to turn on the upstream radiation portion 52 and the downstream radiation portion 54 and to turn off the middle radiation portion 53. As a result, the dots Dt31 (see FIG. 10B) of the ink (in this example, the color ink and the white ink) cured immediately after landing on the medium M, and the dots Dt32 (see FIG. 10B) of the ink flattened and then cured, are present in a mixed manner for color printing. Therefore, a glossier color image is realized than in the case where the radiation portions 52 through 54 are all turned on.

In this preferred embodiment, in the primer printing mode, as shown in FIG. 13A, the primer path controller 85 controls the path operation such that the primer ink is ejected from the primer nozzle array 44*d*. While the path operation is performed under the control of the primer path controller 85, the first light radiation controller 65 controls the light radiation device 50 to turn on the upstream radiation portion 52 and the downstream radiation portion 54 and to turn off the middle radiation portion 53. As a result, the dots Dt41 (see FIG. 13B) of the primer ink cured immediately after landing on the medium M, and the dots Dt42 (see FIG. 13B) of the primer ink flattened and then cured, are present in a mixed manner for primer printing. Therefore, a relatively glossy primer image is realized.

In this preferred embodiment, as shown in FIG. 4, length L21 in the transportation direction X of the upstream radiation portion 52 is longer than, or equal to, length L1 in the transportation direction X of the nozzle arrays 44. With such an arrangement, even in the case where, for example, only the upstream radiation portion 52 is turned on, the ink ejected from all the nozzles 45 of the entirety of the nozzle array 44 from the upstream end to the downstream end is irradiated with light with certainty. Therefore, the ink ejected from all the nozzles 45 of the nozzle array 44 is irradiated with light with no need to turn on all the light sources 50A of the light radiation portion 50. This allows the power consumption required to turn on the light sources 50A of the light radiation portion 50 to be reduced.

In this preferred embodiment, as shown in FIG. 4, each light radiation device 50 has one radiation opening 50D formed in the case 50C thereof such that the radiation opening 50D extends through the upstream radiation portion 52, the middle radiation portion 53 and the downstream radiation portion 54. In this preferred embodiment, the region 50Da, of the radiation opening 50D, that is in the upstream radiation portion 52 and the region 50Db, of the radiation opening 50D, that is in the middle radiation portion 53 are continuous to each other. No component is located between the region 50Da of the radiation opening 50D in the upstream radiation portion 52 and the region 50Db of the radiation opening 50D in the middle radiation portion 53. Therefore, the upstream radiation portion 52 may be turned on and the middle radiation portion 53 may be turned off, so that the light radiating from the downstream portion 52*c* of the upstream radiation portion 52 is easily spread in the middle radiation portion 53 as represented by curve G3 in FIG. 6. This allows the radiation intensity of the light radiating from the downstream portion 52*c* of the upstream radiation portion 52 to be decreased. With this arrangement, even in the case where length L1 of the nozzle arrays 44 is shorter than, or equal to, length L21 of the upstream radiation portion 52, the ink dots cured immediately after landing on the medium M and the ink dots flattened and then cured are present in a mixed manner to realize flat color printing.

In this preferred embodiment, in the color printing mode, while the path operation is performed under the control of the color path controller 81, the second light radiation controller 62 controls the light radiation device 50 to turn on the upstream radiation portion 52, the middle radiation portion 53 and the downstream radiation portion 54 as shown in FIG. 8A. With this arrangement, in the color printing mode, the ink dots are cured immediately after landing on the medium M. Therefore, a non-glossy color image formed of the ink dots cured immediately after landing on the medium M is printed on the medium M. In this manner, in this preferred embodiment, the radiation portions 52, 53 and 54 of the light radiation device 50 may be appropriately controlled to be turned on or off, so that a glossy color image or a non-glossy color image is selected to be printed.

In this preferred embodiment, in the gloss printing mode, the clear path controller 83 controls the path operation such that the clear ink is ejected from the clear nozzle array 44*c* as shown in FIG. 9A. While the path operation is performed under the control of the clear path controller 83, the third light radiation controller 67 controls the light radiation device 50 to turn off the upstream radiation portion 52 or the middle radiation portion 53 and to turn on the downstream radiation portion 54. With this arrangement, the clear ink ejected from the clear nozzle array 44*c* is not irradiated with the light from the upstream radiation portion 52 or the middle radiation portion 53 but is irradiated with the light from the downstream radiation portion 54, and thus is cured. This provides a certain time period with certainty until the clear ink starts to cure, and thus flattens the clear ink dots. Therefore, printing with glossy clear ink is realized. In this preferred embodiment, the radiation portions 52, 53 and 54 of the light radiation device 50 may be appropriately controlled to be turned on or off, so that glossy flat color printing or printing with glossy clear ink is selected for the medium M.

In this preferred embodiment, length L21 in the transportation direction X of the upstream radiation portion 52 of the light radiation device 50 is slightly longer than length L1 in the transportation direction X of the nozzle arrays 44. Alternatively, length L21 in the transportation direction X of the upstream radiation portion 52 may be equal to length L1 in the transportation direction X of the nozzle arrays 44.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printing device, comprising:

a support table to support a medium;

a recording head provided above the support table and including a nozzle array that includes a plurality of nozzles from which ink is capable of being ejected onto the medium supported by the support table, the nozzles being lined up in a transportation direction;

a light radiation device provided above the support table and including a light source and a case with a radiation opening through which light emitted from the light source passes, the case accommodating the light source;

a moving mechanism to move the recording head and the light radiation device integrally in a scanning direction crossing the transportation direction as seen in a plan view; and a controller; wherein where the light radiation device is divided in the transportation direction into three portions including an upstream radiation portion, a middle radiation portion and a downstream radiation portion from an upstream side to a downstream side, the upstream radiation portion, the middle radiation portion and the downstream radiation portion are capable of being turned on or off independently;

the upstream radiation portion overlaps the nozzle array in the transportation direction;

a length in the transportation direction of the upstream radiation portion is longer than, or equal to, a distance between the nozzle located at a most upstream position in the transportation direction and the nozzle located at a most downstream position in the transportation direction; and the controller is configured or programmed to include:

a path controller to control a path operation of ejecting ink from the nozzle array of the recording head onto the medium supported by the support table while moving the recoding head and the light radiation device in the scanning direction; and a first light radiation controller to control the light radiation device, during the path operation, to provide an on/off pattern of turning on the upstream radiation portion, turning off the middle radiation portion, and turning on the downstream radiation portion.

2. The printing device according to claim 1, wherein the radiation opening is one radiation opening extending through the upstream radiation portion, the middle radiation portion and the downstream radiation portion.

3. The printing device according to claim 2, wherein a region of the radiation opening in the upstream radiation portion, and a region of the radiation opening in the middle radiation portion, are continuous with each other.

4. The printing device according to claim 1, wherein the nozzle array includes a color nozzle array from which process color ink is capable of being ejected;

the path controller is configured or programmed to include a color path controller to control the path operation such that the process color ink is capable of being ejected from the color nozzle array; and the first light radiation controller is configured or programmed to control the light radiation device to provide the on/off pattern while the path operation is performed under the control of the color path controller.

5. The printing device according to claim 4, wherein the controller is configured or programmed to include a second light radiation controller to control the light radiation device to turn on the upstream radiation portion, the middle radiation portion and the downstream radiation portion while the path operation is performed under the control of the color path controller.

6. The printing device according to claim 1, wherein the nozzle array includes a clear nozzle array from which clear ink is capable of being ejected;

the path controller is configured or programmed to include a clear path controller to control the path operation such that the clear ink is capable of being ejected from the clear nozzle array; and the controller is configured or programmed to include a third light radiation controller to control the light radiation device to turn off the upstream radiation portion and the middle radiation portion and to turn on the downstream radiation portion while the path operation is performed under the control of the clear path controller.

7. The printing device according to claim 1, wherein the nozzle array includes a primer nozzle array from which primer ink is capable of being ejected;

the path controller is configured or programmed to include a primer path controller to control the path operation such that the primer ink is capable of being ejected from the primer nozzle array; and the first light radiation controller is configured or programmed to control the light radiation device to provide the on/off pattern while the path operation is performed under the control of the primer path controller.

8. The printing device according to claim 1, further comprising:

a holding mechanism to hold the medium supported by the support table.

9. The printing device according to claim 1, further comprising:

a transport mechanism to transport the medium supported by the support table in the transportation direction from the upstream side to the downstream side.

10. The printing device according to claim 9, wherein the controller is further configured or programmed to include a transportation controller to control a transportation operation of, after the path operation, transporting the medium supported by the support table downstream in the transportation direction by a distance shorter than a length in the transportation direction of the nozzle array.

11. A printing device, comprising:

a support table to support a medium;

a recording head provided above the support table and including a nozzle array that includes a plurality of nozzles from which ink is capable of being ejected onto the medium supported by the support table, the nozzles being lined up in a transportation direction;

a light radiation device provided above the support table and including a light source and a case with a radiation opening through which light emitted from the light source passes, the case accommodating the light source;

a moving mechanism to move the recording head and the light radiation device integrally in a scanning direction crossing the transportation direction as seen in a plan view; and a controller; wherein where the light radiation device is divided in the transportation direction into three portions including an upstream radiation portion, a middle radiation portion and a downstream radiation portion from an upstream side to a downstream side, the upstream radiation portion, the middle radiation portion and the downstream radiation portion are capable of being turned on or off independently;

the upstream radiation portion overlaps the nozzle array in the transportation direction;

the middle radiation portion does not overlap the nozzle array in the transportation direction; and the controller is configured or programmed to include:

a path controller to control a path operation of ejecting ink from the nozzle array of the recording head onto the medium supported by the support table while moving the recoding head and the light radiation device in the scanning direction; and a first light radiation controller to control the light radiation device, during the path operation, to provide an on/off pattern of turning on the upstream radiation portion, turning off the middle radiation portion, and turning on the downstream radiation portion.

12. The printing device according to claim 11, wherein the length in the transportation direction of the upstream radiation portion is longer than, or equal to, the length in the transportation direction of the nozzle array.

13. The printing device according to claim 11, further comprising:

a holding mechanism to hold the medium supported by the support table.

14. The printing device according to claim 11, further comprising:

a transport mechanism to transport the medium supported by the support table in the transportation direction from the upstream side to the downstream side.

15. The printing device according to claim 14, wherein the controller is further configured or programmed to include a transportation controller to control a transportation operation of, after the path operation, transporting the medium supported by the support table downstream in the transportation direction by a distance shorter than a length in the transportation direction of the nozzle array.

16. A printing device, comprising:

a support table to support a medium;

a recording head provided above the support table and including a nozzle array that includes a plurality of nozzles from which ink is capable of being ejected onto the medium supported by the support table, the nozzles being lined up in a transportation direction;

a light radiation device provided above the support table and including a light source and a case with a radiation opening through which light emitted from the light source passes, the case accommodating the light source;

a moving mechanism to move the recording head and the light radiation device integrally in a scanning direction crossing the transportation direction as seen in a plan view; and a controller; wherein where the light radiation device is divided in the transportation direction into three portions including an upstream radiation portion, a middle radiation portion and a downstream radiation portion from an upstream side to a downstream side, the upstream radiation portion, the middle radiation portion and the downstream radiation portion are capable of being turned on or off independently;

the upstream radiation portion overlaps the nozzle array in the transportation direction;

no light-blocking component is provided at a border between the upstream radiation portion and the middle radiation portion or a border between the middle radiation portion and the downstream radiation portion; and the controller is configured or programmed to include:

a path controller to control a path operation of ejecting ink from the nozzle array of the recording head onto the medium supported by the support table while moving the recoding head and the light radiation device in the scanning direction; and a first light radiation controller to control the light radiation device, during the path operation, to provide an on/off pattern of turning on the upstream radiation portion, turning off the middle radiation portion, and turning on the downstream radiation portion.

17. The printing device according to claim 16, further comprising:

a holding mechanism to hold the medium supported by the support table.

18. The printing device according to claim 16, further comprising:

in a transport mechanism to transport the medium supported by the support table in the transportation direction from the upstream side to the downstream side.

19. The printing device according to claim 18, wherein the controller is further configured or programmed to include a transportation controller to control a transportation operation of, after the path operation, transporting the medium supported by the support table downstream in the transportation direction by a distance shorter than a length in the transportation direction of the nozzle array.

* * * * *